(12) United States Patent
Shoji

(10) Patent No.: US 10,976,912 B2
(45) Date of Patent: Apr. 13, 2021

(54) INFORMATION PROCESSING DEVICE, INFORMATION PROCESSING METHOD, AND RECORDING MEDIUM

(71) Applicant: SONY CORPORATION, Tokyo (JP)

(72) Inventor: Yuki Shoji, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/316,893

(22) PCT Filed: Jun. 9, 2017

(86) PCT No.: PCT/JP2017/021537
§ 371 (c)(1),
(2) Date: Jan. 10, 2019

(87) PCT Pub. No.: WO2018/042811
PCT Pub. Date: Mar. 8, 2018

(65) Prior Publication Data
US 2019/0250787 A1 Aug. 15, 2019

(30) Foreign Application Priority Data
Aug. 31, 2016 (JP) .............................. JP2016-169638

(51) Int. Cl.
*G06F 3/0485* (2013.01)
*G06F 3/0488* (2013.01)
*G06F 3/0481* (2013.01)
*G09G 5/34* (2006.01)
*G09G 5/36* (2006.01)

(52) U.S. Cl.
CPC .......... *G06F 3/0485* (2013.01); *G06F 3/0481* (2013.01); *G06F 3/0488* (2013.01); *G09G 5/34* (2013.01); *G09G 5/36* (2013.01)

(58) Field of Classification Search
CPC ........... G06F 3/0485; G06F 3/011–015; G06F 3/012–013; G06F 3/0481–0483; G06F 3/048; G09G 5/36; G09G 5/34
See application file for complete search history.

(56) References Cited

U.S. PATENT DOCUMENTS 8,537,180 B1 * 9/2013 Grieve ..................... G09G 5/34
345/660
2002/0033848 A1 * 3/2002 Sciammarella ....... G06F 3/0481
715/838

(Continued)

FOREIGN PATENT DOCUMENTS

JP 2002-507344 A 3/2002
JP 2003-330586 A 11/2003
(Continued)

*Primary Examiner* — Jennifer N To
*Assistant Examiner* — Liang Y Li
(74) *Attorney, Agent, or Firm* — Paratus Law Group, PLLC

(57) ABSTRACT

There is provided an information processing device to utilize a limited display area more effectively, and present display information in a more suitable mode, the information processing device including: a processing unit configured to determine an action of a predetermined object; and an output control unit configured to control an information amount of display information to be displayed on a predetermined output unit in accordance with a determination result of the action.

17 Claims, 17 Drawing Sheets

(56) References Cited

U.S. PATENT DOCUMENTS

| | | | | |
|---|---|---|---|---|
| 2004/0113952 A1* | 6/2004 | Randall | ............... | G06F 3/0485 |
| | | | | 715/830 |
| 2011/0145863 A1* | 6/2011 | Alsina | ................ | G06F 3/0482 |
| | | | | 725/44 |
| 2013/0290116 A1* | 10/2013 | Hepworth | ............ | G06F 3/0482 |
| | | | | 705/14.73 |
| 2014/0210705 A1* | 7/2014 | Kim | .................. | G06F 3/0485 |
| | | | | 345/156 |
| 2014/0232639 A1* | 8/2014 | Hayashi | ............... | G06F 3/048 |
| | | | | 345/156 |
| 2014/0292760 A1* | 10/2014 | Shikolay | ............. | G06F 3/0485 |
| | | | | 345/428 |

FOREIGN PATENT DOCUMENTS

| | | |
|---|---|---|
| JP | 2005-078143 A | 3/2005 |
| JP | 2008-129689 A | 6/2008 |
| JP | 2009-289101 A | 12/2009 |
| JP | 2010-191892 A | 9/2010 |
| JP | 2011-090586 A | 5/2011 |
| JP | 2011-203982 A | 10/2011 |
| JP | 2014-059616 A | 4/2014 |
| WO | WO 2013/099529 A1 | 7/2013 |
| WO | WO 2015/173961 A | 11/2015 |

* cited by examiner

FIG. 2
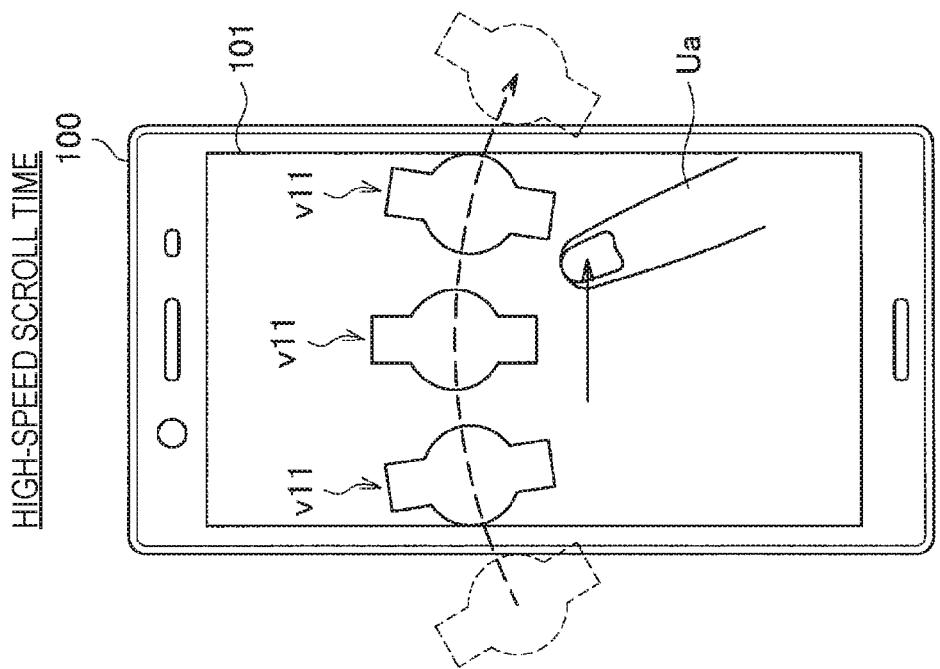
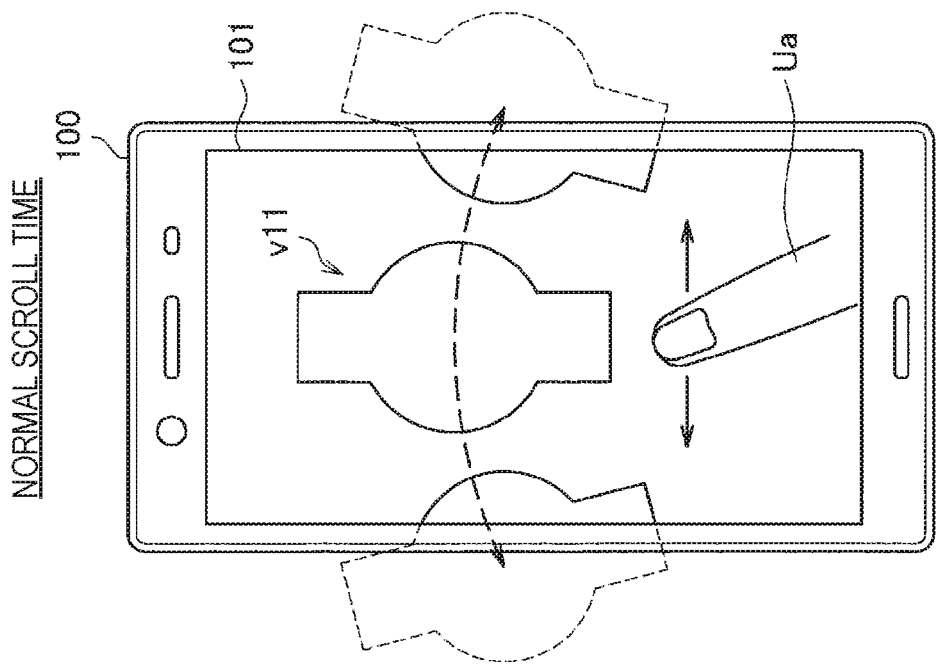

FIG. 14
NORMAL SCROLL TIME
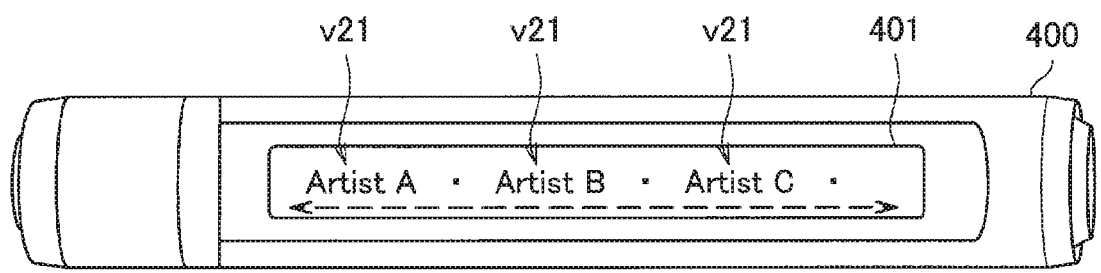
HIGH-SPEED SCROLL TIME
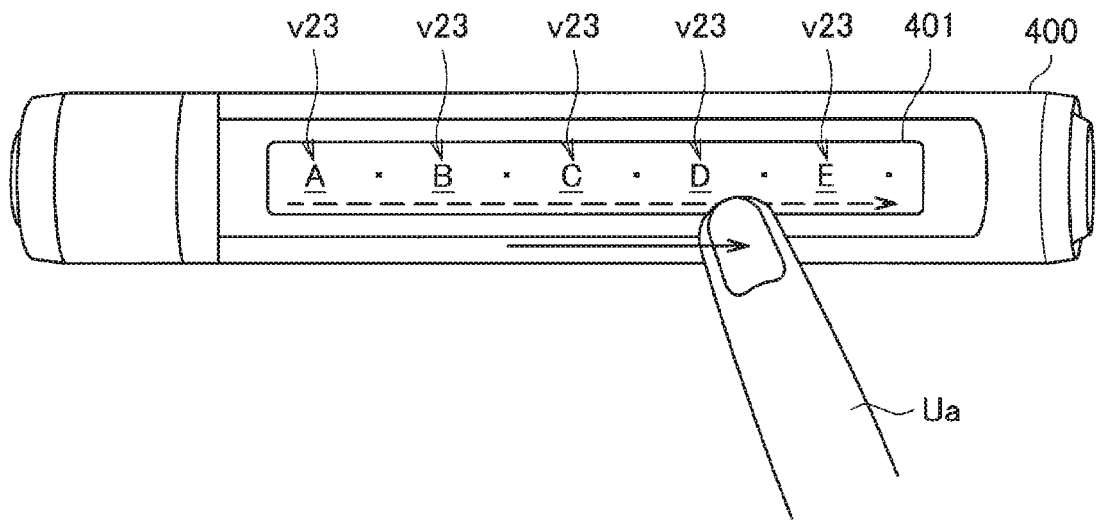

FIG. 15
DURING STOP
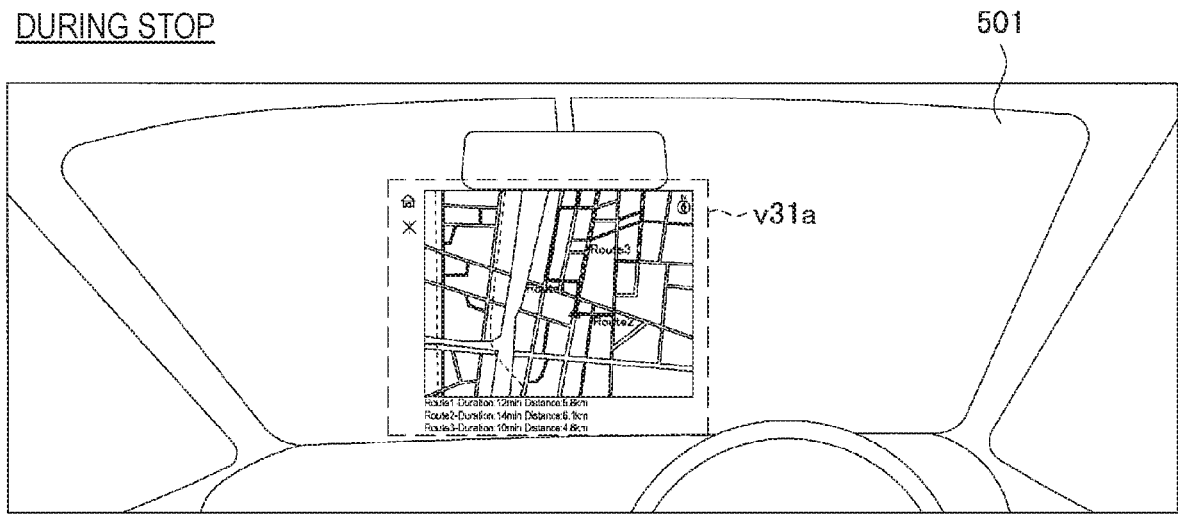
DURING TRAVEL
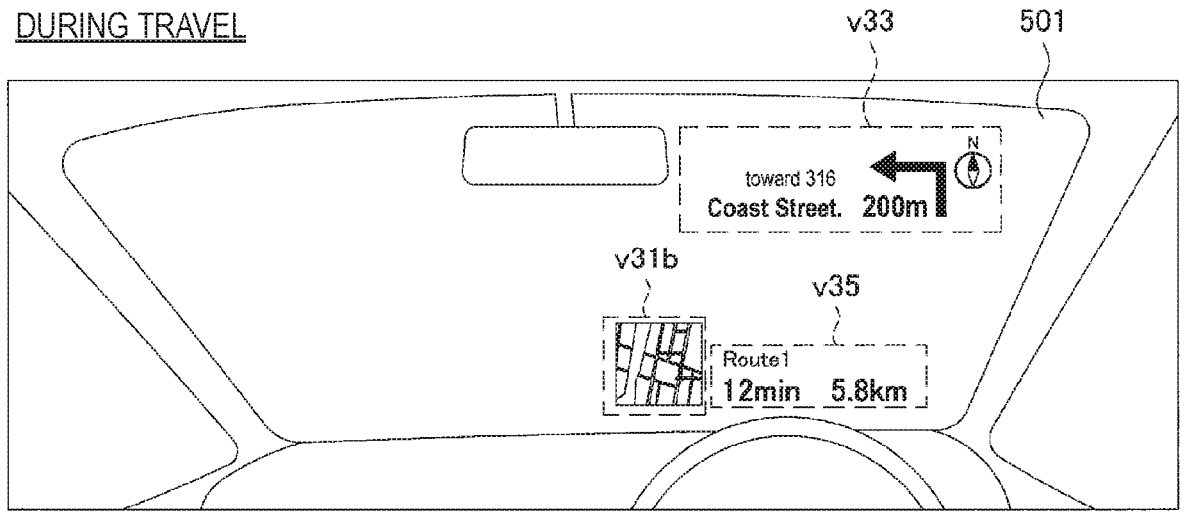

FIG. 16
DURING STOP
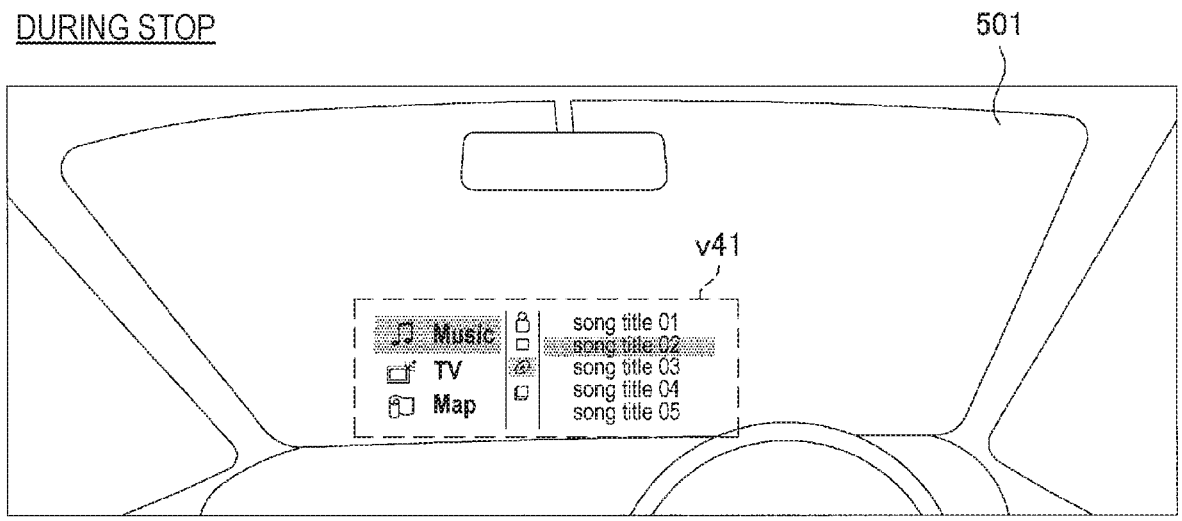
DURING TRAVEL
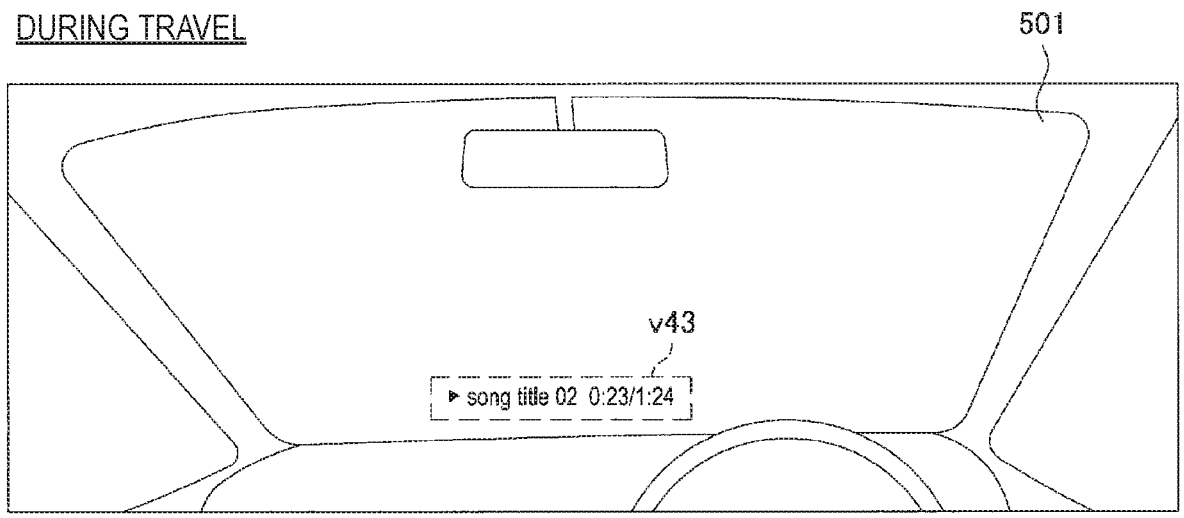

INFORMATION PROCESSING DEVICE, INFORMATION PROCESSING METHOD, AND RECORDING MEDIUM

CROSS REFERENCE TO PRIOR APPLICATION

This application is a National Stage Patent Application of PCT International Patent Application No. PCT/JP2017/021537 (filed on Jun. 9, 2017) under 35 U.S.C. § 371, which claims priority to Japanese Patent Application No. 2016-169638 (filed on Aug. 31, 2016), which are all hereby incorporated by reference in their entirety.

TECHNICAL FIELD

The present disclosure relates to an information processing device, an information processing method, and a recording medium.

BACKGROUND ART

In recent years, information processing devices such as a smartphone and a tablet terminal have become widely available. On information processing devices such as a smartphone and a tablet terminal, various types of content are displayed. As a user interface (UI) for selecting each of such various types of content, for example, a UI configured such that a part of a list in which the plurality of pieces of content (display information such as images, icons, or thumbnails, for example) are listed is displayed as a display target, and by causing the list to be scrolled, content which is the display target can be changed has been proposed. When such a UI is provided, a user can select a desired piece of content by appropriately scrolling the displayed content list even under such a situation where all pieces of content to be selection targets do not fall within the screen, for example.

For example, Patent Literature 1 discloses an example of a UI that, by arranging a plurality of pieces of content as a list along a predetermined direction, causing a part of the list to be displayed as a display target, and causing the content list to be scrolled along the one direction, changes content which is the display target.

CITATION LIST

Patent Literature

Patent Literature 1: JP 2002-507344T

DISCLOSURE OF INVENTION

Technical Problem

In the meantime, in recent years, relatively small information processing devices have become available among the above-described information processing devices. For example, a so-called wearable terminal that can be carried and used by a user by wearing the terminal on a part of the body has been proposed, and such a wearable terminal tends to be configured to be relatively small in terms of the characteristic of being worn by the user in such an information processing device, with size reduction of a housing, an area for displaying information, such as a display, also tends to be smaller. In addition, not limited to a smartphone and a wearable terminal, but also for a vehicle-mounted system such as a car navigation device, for example, a so-called head-up display in which a part of the front glass is utilized as an area for displaying information, and the like, for example, have been proposed. In this manner, assuming various usage scenes, various devices in accordance with the usage scenes have been proposed, and among the devices, devices whose area for displaying information is restricted also exist.

Therefore, the present disclosure proposes an information processing device, an information processing method, and a recording medium that can utilize a display area for displaying information more effectively, and provide information in a more suitable manner.

Solution to Problem

According to the present disclosure, there is provided an information processing device including: a processing unit configured to determine an action of a predetermined object; and an output control unit configured to control an information amount of display information to be displayed on a predetermined output unit in accordance with a determination result of the action.

In addition, according to the present disclosure, there is provided an information processing method including, by a computer: determining an action of a predetermined object; and in accordance with a determination result of the action, controlling an information amount of display information to be displayed on a predetermined output unit.

In addition, according to the present disclosure, there is provided a recording medium having a program recorded thereon, the program causing a computer to execute: determining an action of a predetermined object; and in accordance with a determination result of the action, controlling an information amount of display information to be displayed on a predetermined output unit.

Advantageous Effects of Invention

According to the present disclosure as described above, an information processing device, an information processing method, and a recording medium that can utilize a display area for displaying information more effectively, and provide information in a more suitable manner are provided.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 2 is an explanatory diagram for describing an example of a UI provided by the information processing device according to the embodiment.

FIG. 14 is an explanatory diagram for describing a third application example of the information processing device according to the embodiment.

FIG. 15 is an explanatory diagram for describing a fourth application example of the information processing device according to the embodiment.

FIG. 16 is an explanatory diagram for describing another mode of the fourth application example of the information processing device according to the embodiment.

MODE(S) FOR CARRYING OUT THE INVENTION

Figure 1:
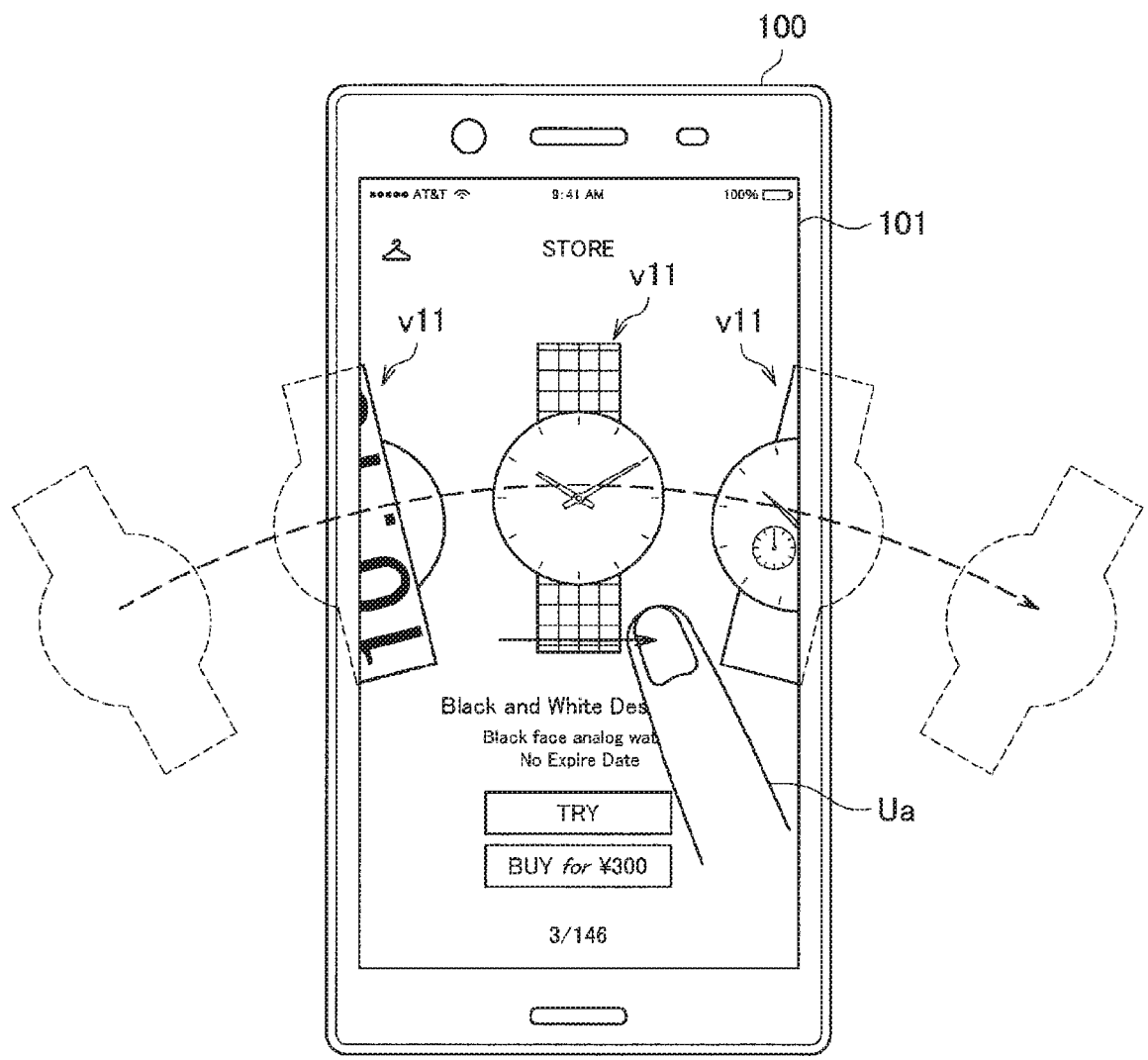
FIG. 1 is an explanatory diagram for describing an example of a UI provided by an information processing device according to an embodiment of the present disclosure.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that description will be provided in the following order.
1. Overview
2. Functional configuration
3. Processing
4. Variations
4.1. Variation 1: control example for information amount
4.2. Variation 2: example of UI
5. Application examples
5.1. Application example 1: application example for wearable terminal
5.2. Application example 2: application example for large display
5.3. Application example 3: application example for device whose display area is restricted further
5.4. Application example 4: application example for vehicle-mounted system
6. Hardware configuration
7. Conclusion <<1. Overview>>

First, upon organizing technical problems of an information processing device 100 according to an embodiment of the present disclosure, an overview of an example of a user interface provided by the information processing device 100 will be described.

In recent years, information processing devices, such as a personal computer (PC), a smartphone, and a tablet terminal, that can provide various functions (for example, applications) and content have become widely available. In such an information processing device, as a user interface (UI) for selecting each of various pieces of content, a UI configured such that a part of a list in which a plurality of pieces of content (display information such as images, icons, or thumbnails, for example) is listed is displayed as a display target on an output unit such as a display, and by causing the list to be scrolled, content which is the display target can be changed has been proposed, for example. When such an UI is provided, a user can select a desired piece of content by appropriately scrolling the displayed content list even under such a situation where all pieces of content to be selection targets do not fall within the screen of the information processing device, for example.

On the other hand, in recent years, relatively small information processing devices, including a smartphone, that are configured to be portable have become available. Particularly in recent years, a so-called wearable terminal that can be carried and used by a user by wearing the terminal on a part of the body has also been proposed, and such a wearable terminal is often configured to be relatively small in terms of the characteristic of being worn by the user. In such an information processing device, with size reduction of a housing, an output unit such as a display also becomes smaller, and an area for displaying various types of information is often restricted. In addition, not limited to a smartphone and a wearable terminal, but also for a vehicle-mounted system such as a car navigation device, for example, a so-called head-up display in Which a part of the front glass is utilized as an area for displaying information, and the like, for example, have been proposed. Also in such a vehicle-mounted system, in order to display various types of information according to the situation upon ensuring a wider field of view, for example, a display area for displaying the information may be restricted. In this manner, assuming various usage scenes, various devices in accordance with the usage scenes have been proposed, and among the devices, many devices whose display area for displaying information is restricted also exist.

In this manner, under the situation where the display area is restricted, in the case of, in order to improve recognizability of content, for example, displaying the content in the display area in a larger size, an area for displaying other pieces of content to be selection targets may be restricted (that is, perspicuity may be restricted). This is caused by an increase in the proportion of an area occupied by the content with respect to the extent of the display area with an increase in the size of the content.

In view of the circumstances as described above, the present disclosure proposes a UI capable of utilizing a limited display area more effectively, and presenting display information such as various types of content to a user in a more suitable mode according to the situation. For example, FIG. 1 and FIG. 2 are explanatory diagrams for describing an example of a UI provided by the information processing device according to an embodiment of the present disclosure.

In the example shown in FIG. 1, such a situation where the user selects at least some pieces of content from among a plurality of pieces of content via the information processing device 100 such as a smartphone or a tablet terminal is assumed. Specifically, in the example shown in FIG. 1, in a wristwatch Whose clock face and belt portion are configured as electronic paper, the clock face and the pattern (design) of the belt to be displayed on the electronic paper are presented to the user as content v11.

In the example shown in FIG. 1, pieces of the display information v11 associated with one or more pieces of content, respectively, are arranged along an arcuate track, and at least sonic pieces of the display information v11 (in other words, a partial area) among the arranged sequential pieces of the display information v11 are displayed on an output unit 101 (for example, a display or the like) of the information processing device 100. The display area of the output unit 101 of the information processing device 100 is configured as a touch panel. On the basis of such a configuration, when a manipulation such as so-called swipe or drag performed by a manipulation body Ua such as a finger or a stylus, for example, is accepted, the information processing device 100 causes the sequential pieces of the display information v11 to be scrolled along the arcuate track relatively with respect to the display area of the output unit 101. Accordingly, each of the sequential pieces of the display information v11 will sequentially performs frame-in and frame-out with respect to the display area of the output unit 101, and the display information v11 displayed on the output unit is sequentially changed. With such control, the user can cause a desired piece of the display information v11 to be displayed on the output unit 101 by appropriately scrolling the sequential pieces of the display information v11 even under such a situation where all pieces of the display information v11 (in other words, content) to be selection targets do not fall within the screen, for example. That is, the user can search for and select a desired piece of content from among sequential pieces of content to be selection targets.

Note that, in the following description, a manipulation for tracing the sequential pieces of the display information v11 with a manipulation body such as a finger or a stylus to move content, like a manipulation such as swipe or drag or the like, for example, will also be referred to as a "scroll manipulation". Note that the scroll manipulation is not limited to the manipulation via the touch panel as shown in FIG. 1. For example, in a so-called gesture input in which the information processing device 100 recognizes manipulation contents on the basis of a moving image of a predetermined part of the user, such as a finger or hand, captured by an imaging device or the like, a predetermined gesture may be recognized as a scroll manipulation. Of course, not only a touch panel, but also a predetermined manipulation among various manipulations via an input device such as a mouse or a keyboard may be recognized as a scroll manipulation. In addition, in the case of a manipulation with a remote controller for a device such as a television receiver, it may be recognized that a scroll manipulation has been started when a predetermined manipulation button is pressed and held, or the like.

In addition, the information processing device 100 according to an embodiment of the present disclosure recognizes, estimates, or determines various states or situations such as an action of the user depending on the input situation of a manipulation on an input device such as a touch panel, for example, and controls the display mode of the display information v11 in accordance with a result of the recognition, estimation, or determination. Note that, in the following description, in the case of merely expressing "recognize" about various states or situations, the case of "estimating" the states or situations and the case of "determining" the states or situations may also be included unless particularly explained. For example, in the example shown in FIG. 2, the information processing device 100 recognizes whether or not it is a situation where a desired piece of the display information v11 is being searched for among the sequential pieces of the display information v11 in accordance with the input state of a manipulation performed by the user, and controls the display mode of the display information v11 to be displayed by scrolling in accordance with a recognition result.

More specifically, at the normal time (at the normal scroll time), the information processing device 100 controls the display mode of the display information v11 such that the size of the display information v11 becomes larger, as shown in the left drawing in FIG. 2. Note that "the normal time" in the present description may be equivalent to, for example, a mode of, while carefully screening each piece of content, slowly forwarding the content, that is, a mode of causing a large part of the display screen to be occupied by display of a piece of content, and slowly repeating frame-in and frame-out of the piece of content as if pages are turned. In this case, since the proportion of each piece of the display information v11 occupying the display area of the output unit 101 becomes larger, recognizability of the display information v11 as displayed is improved. On the other hand, since the number of pieces of the display information v11 that can be displayed in the display area is restricted, the efficiency (hereinafter also referred to as "searching efficiency") for the user to search for a desired piece of the display information v11 among the sequential pieces of the display information v11 may be reduced, for example.

On the other hand, on the basis of contents of a manipulation input by the user, for example, the information processing device 100 recognizes that it is a situation where the user is searching for a desired piece of the display information v11 among the sequential pieces of the display information v11 by scrolling the sequential pieces of the display information v11 at high speed. In such a case, the information processing device 100 controls the display mode of the display information v11 such that the size of each piece of the display information v11 becomes smaller to cause a larger number of pieces of the display information v11 to be displayed on the output unit 101 on the output unit 101, as shown in the right drawing in FIG. 2, for example. Specifically, the information processing device 100 ensures a space by restricting the size of the display information v11 to make the proportion of an area occupied by the display information v11 smaller with respect to the extent of the display area of the output unit 101, and causes another piece of the display information v11 to be displayed in the ensured space. With such control, as in the example shown in the right drawing in FIG. 2, for example, the number of pieces of the display information v11 displayed increases as compared to the example shown in the left drawing. Therefore, it is possible to reduce the frequency of scroll manipulations when the user searches for a desired piece of the display information v11 (that is, to simplify a manipulation), and improvement in efficiency of searching for a desired piece of the display information v11 among the sequential pieces of the display information v11 performed by the user is expected. In addition, the information processing device 100 automatically and seamlessly controls the information amount of the display information v11 to be displayed on the output unit 101 as an extension of a scroll manipulation performed by the user. This allows the user to efficiently search for a desired piece of the display information v11 among the sequential pieces of the display information v11 without being aware of a complicated manipulation such as switching the mode of displaying information on the output unit 101 to a mode suitable for the search of the desired piece of the display information v11.

Note that the information processing device 100 may exert control such that screens are switched seamlessly by means of a so-called animation display when a transition is made from the state shown in the left drawing in FIG. 2 to the state shown in the right drawing. In this case, it is possible to achieve the above-described animation display by displaying an intermediate image that connects the both for a short while at the transition between both the screens, for example. As a more specific example, when switching screens, the information processing device 100 may switch the screens seamlessly by means of an animation display that gives such an appearance impression that the field of view is enlarged centering on a piece of content at Which the user is placing the line of sight. With such control, even in the case where the screen transitions as shown in FIG. 2 under a situation of searching for a desired piece of content while sequentially performing frame-in and frame-out of each piece of content, it is possible for the user to continue the manipulation without losing sight of the piece of content at which the user has been placing the line of sight. In this manner, since the state in which the user is gazing at a desired piece of content is maintained even if screens are switched, the need for the user to perform work such as moving the line of sight to search for the piece of content at which he/she has been glancing, and by extension, the effect of lightening a burden on the user is also expected.

Note that the method is not particularly limited as long as the information processing device 100 is capable of recognizing that it is a situation where the user is searching for a desired piece of the display information v11 among the sequential pieces of the display information v11. For example, in the case where scroll manipulations are performed by a predetermined number of times or more within a certain time period, the information processing device 100 may recognize that it is a situation where the user is searching for a desired piece of the display information v11 among the sequential pieces of the display information v11. In addition, as still another example, in the case where the manipulation amount (in other words, equivalent to the amount of movement of the manipulation body Ua and the length to be scrolled) of a single scroll manipulation is more than or equal to a predetermined amount, the information processing device 100 may recognize that it is a situation where the user is searching for a desired piece of the display information v11 among the sequential pieces of the display information v11. That is, the information processing device 100 may recognize that it is a situation where the user is searching for a desired piece of the display information v11 among the sequential pieces of the display information v11 in accordance with at least any of the number, frequency, or manipulation amount of predetermined manipulations (for example, scroll manipulations), for example.

In this manner, the information processing device 100 according to the present embodiment further improves recognizability of the displayed display information v11 by exerting control at the normal time, for example, such that each piece of the display information v11 is displayed in a larger size. In addition, under a situation where the user is searching for a desired piece of the display information v11 (content) at high-speed scrolling or the like, the information processing device 100 according to the present embodiment increases the number of pieces of the display information v11 to be displayed on the output unit RH by restricting the size of each piece of the display information v11. Since this allows the user to search for a desired piece of the display information v11 without involving a complicated manipulation, improvement in efficiency of searching for a desired piece of the display information v11 among the sequential pieces of the display information v11 is expected. That is, the information processing device 100 according to the present embodiment controls the information amount of display information for example, the number of pieces of display information to be displayed) to be presented to the user via the output unit 101 in accordance with a recognition result of an action of the user (that is, a determination result about whether or not a predetermined action has been performed), for example. With the configuration as described above, it is possible to effectively utilize a display area in which display information is to be displayed in accordance with the utilization situation of a UI that selectively presents at least some pieces of display information among sequential pieces of display information to the user, and by extension, to present each piece of display information to the user in a more suitable anode.

Upon organizing the technical problems of the information processing device 100 according to an embodiment of the present disclosure with reference to FIG. 1 and FIG. 2, an overview of an example of the UI provided by the information processing device 100 has been described above. Note that, hereinafter, an example of a configuration and processing of the information processing device 100 according to the present embodiment will be described in more detail.

<<2. Functional Configuration>>

Figure 3:
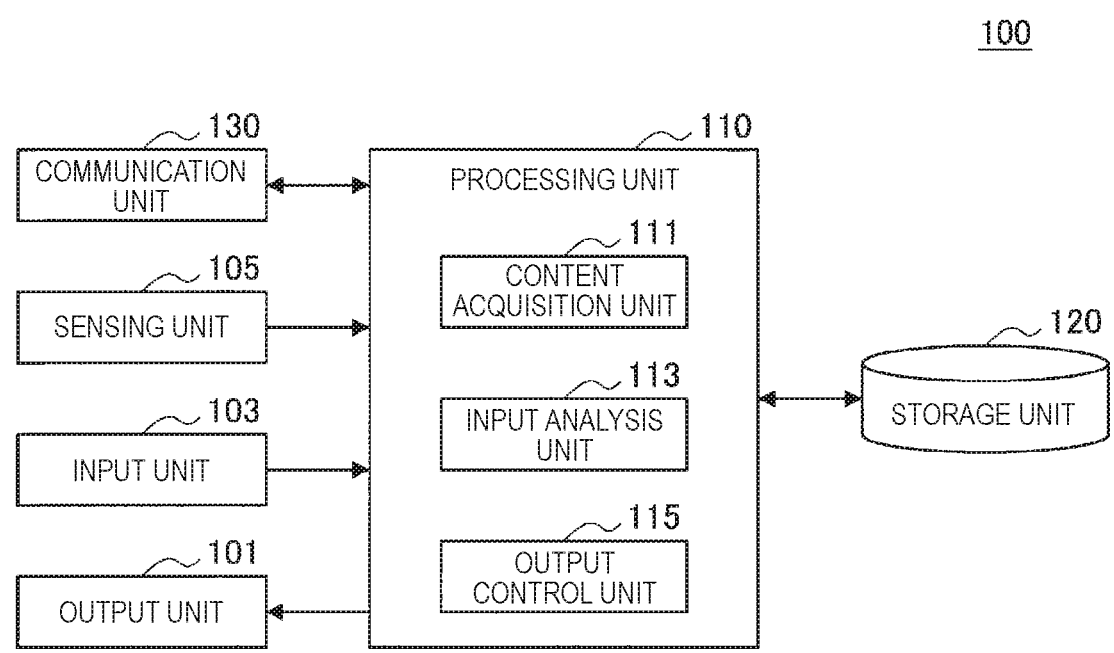
FIG. 3 is a block diagram showing an example of a functional configuration of the information processing device according to the embodiment.

Subsequently, an example of a functional configuration of the information processing device 100 according to the present embodiment will be described with reference to FIG. 3, FIG. 3 is a block diagram showing an example of a functional configuration of the information processing device 100 according to the present embodiment.

As shown in FIG. 3, the information processing device 100 includes the Output unit 101, an input unit 103, a processing unit 110, a storage unit 120, and a communication unit 130. In addition, the information processing device 100 may include a sensing unit 105. In addition, the processing unit 110 includes a content acquisition unit 111, an input analysis unit 113, and an output control unit 115.

The output unit 101 presents various types of information to the user by displaying a screen on which display information to be presentation targets is presented. The output unit 101 is equivalent to the output unit 101 shown in FIG. 1 and FIG. 2. As a specific example, the output unit 101 presents display information to the user by displaying the above-described screen in accordance with control exerted by the processing unit 110 which will be described later. Note that the output unit 101 includes a display device such as a liquid crystal display or an EL display, for example. In addition, a portion displayed as the above-described screen among sequential pieces of display information to be display targets on the output unit 101 is equivalent to an example of the display area of the output unit 101.

The input unit 103 accepts an input (manipulation) on the information processing device 100 made by the user. Then, the input unit 103 outputs control information indicating a result of input made by the user to the processing unit 110 which will be described later. Note that the input unit 103 may include input devices such as a mouse, a keyboard, a touch panel, a button, a switch, a lever, and a pedal, for example.

The sensing unit 105 is a component for acquiring context information indicating various states or situations. For example, the sensing unit 105 includes various sensors, and may acquire information indicating various states or situations as context information.

As a specific example, the sensing unit 105 includes an acceleration sensor, an angular velocity sensor, and the like, and by sensing an action (in other words, a change in position or line of sight) of a predetermined object (for example, the information processing device 100, a user holding the information processing device 100, or the like), may acquire the sensing result as context information.

In addition, the sensing unit 105 includes an imaging unit that captures video of an external environment, and on the basis of an imaging result obtained by the imaging unit, may acquire context information indicating an action of a predetermined object. As a more specific example, the sensing unit 105 may acquire an imaging result of an action of a predetermined part of the user obtained by the imaging unit as context information indicating a gesture (for example, a gesture manipulation) made by the user.

In addition, the sensing unit 105 may acquire context information from various devices provided external to the information processing device 100. As a specific example, the sensing unit 105 may acquire context information indicating biological information of the user from various sensors so-called biosensors) placed on the body of the user. As a more specific example, by sensing changes in blood flow, heart rate, perspiration, and the like of the user, the sensing unit 105 may acquire the sensing result as context information indicating biological information of the user. In addition, as still another example, the sensing unit 105 may acquire context information indicating the operation state of an external device (for example, a traveling state of a vehicle) based on sensing results obtained by various sensors placed in the external device such as the vehicle from the sensors or the external device. Then, the sensing unit 105 outputs the acquired context information to the processing unit 110 which will be described later.

The communication unit 130 is a component for the information processing device 100 to communicate with another external device via a wireless or wired communication path. For example, the communication unit 130 receives various types of information from an external device, and outputs the information to the processing unit 110. In addition, the communication unit 130 transmits various types of information output from the processing unit 110 to an external device, in the case of communicating with an external device via a wireless communication path, for example, the communication unit 130 may include a communication antenna, a radio frequency (RF) circuit, a baseband processor, and the like.

The storage unit 120 temporarily or permanently stores programs and data for the operation of the information processing device 100. As a specific example, the storage unit 120 may store various types of content. In addition, the storage unit 120 may store programs and data for achieving various functions of the information processing device 100. The storage unit 120 may include a magnetic storage unit device such as a hard disk drive (HDD), a semiconductor storage device, an optical storage device, a magneto-optical storage device, or the like, for example.

The content acquisition unit 111 acquires one or more pieces of content to be targets for presentation to the user. The content acquisition unit 111 may acquire content provided by another device via the communication unit 130. In addition, the content acquisition unit 111 may acquire content stored in the storage unit 120. The content acquisition unit 111 outputs the acquired content to the output control unit 115.

In addition, the above-described one or more pieces of content may be content provided by a plurality of information services. As a specific example, the above-described plurality of information services include a news distribution service, a motion picture distribution service, a social network service (SNS), and the like. In addition, each of the above-described one or more pieces of content may be content provided by separate information services. As a specific example, each of the above-described one or more pieces of content is header information provided by an information service, summary information of information provided by the information service, or the like.

In addition, the above-described one or more pieces of content may include at least any of character information or image information as an information element. As an example, any piece of content among the above-described one or more pieces of content may include the name of an information service, character information such as header information or summary information of the information service, or image information such as a logo mark of the information service or a header image of the information service, as an information element.

In addition, the above-described one or more pieces of content may be content provided by a single information service. As an example, the above-described one or more pieces of content may be a product (for example, content itself) traded via an online shopping site or the like, or display information (such as, for example, display information displayed on a catalogue or the like) concerning the product. In addition, as another example, each of the above-described one or more pieces of content may be provided by a news distribution service, and may be content of individual news. As another example, each of the above-described one or more pieces of content may be provided by a motion picture distribution service, and may be content information of individual motion pictures. As still another example, each of the above-described one or more pieces of content information may be provided by an SNS, and may be content information of individual posts or messages.

In the case where the user performs a manipulation on the input unit 103, the input analysis unit 113 acquires control information indicating an input result based on the manipulation from the input unit 103. On the basis of the acquired control information, the input analysis unit 113 recognizes contents of the manipulation such as a manipulation position to be a manipulation target in the screen displayed on the output unit 101, a manipulation direction indicating the direction of the manipulation, the manipulation amount indicating the length of the manipulation, and the manipulation time indicating the duration of the manipulation. With such a configuration, it is possible for the input analysis unit 113 to recognize that, in the case where the user performs a predetermined manipulation on the input unit 103, the predetermined manipulation has been performed, for example.

In addition, by acquiring context information indicating various states or situations from a sensing unit 313, the input analysis unit 113 may recognize the states or situations. As a specific example, by acquiring context information indicating biological information of the user from the sensing unit 313, the input analysis unit 113 may recognize a state of the user and by extension, an action of the user) such as whether or not the user is in a state of stopping, walking, or running. In addition, as another example, by acquiring context information indicating the operation state (for example, traveling state) of a vehicle from the sensing unit 313, the input analysis unit 113 may recognize whether or not the vehicle is traveling. With such a configuration, in the case where a corresponding state or situation changes on the basis of the acquired context information, for example, the input analysis unit 113 can recognize the change in the state or situation.

In the above manner, the input analysis unit 113 recognizes contents of a manipulation performed by the user and a change in various states or situations, and outputs information indicating a recognition result to the output control unit 115 which will be described later.

In addition, the input analysis unit 113 recognizes contents of a manipulation performed by the user and a change in various states or situations, and may determine an action of a predetermined object (for example, the user, a part of the user, or the like) in accordance with the recognition result. As a specific example, in accordance with at least any of the number, frequency, or the manipulation amount of scroll manipulations, the input analysis unit 113 may determine whether or not the user is performing an action related to a search for a desired piece of display information (in other words, whether or not it is a situation where the user is searching for a desired piece of display information). In this case, the input analysis unit 113 may output information indicating a determination result of an action of a predetermined object to the output control unit 115.

The output control unit 115 acquires sequential pieces of content (one or more pieces of content) from the content acquisition unit 111, and causes display information to be displayed on the output unit 101 in accordance with an acquisition result. As a specific example, the output control unit 115 may cause image content itself such as still images or moving images to be displayed on the output unit 101. In addition, the output control unit 115 may cause display information associated with each of the sequential pieces of content to be displayed on the output unit 101, like thumbnails or icons of the acquired sequential pieces of content, or the like.

Note that the output control unit 115 may arrange display information corresponding to each of the acquired sequential pieces of content, for example, along a predetermined track or axis, and may cause at least some pieces of the display information (in other words, at least a partial area) among the arranged sequential pieces of display information to be displayed on the output unit 101, in addition, in this case, the output control unit 115 may acquire information indicating contents of a manipulation performed by the user or a recognition result of a change in various states or situations from the input analysis unit 113, and in accordance with the acquired information, may cause the arranged sequential pieces of display information to be scrolled relatively with respect to the display area. With such control, even under such a situation where all pieces of display information to be selection targets do not fall within the screen, it is possible for the user to appropriately scroll a desired piece of the display information in the display area of the output unit 101 by causing the sequential pieces of display information.

In addition, the output control unit 115 may acquire information indicating a determination result of an action of a predetermined object from the input analysis unit 113, and in accordance with the acquired information, may control the information amount of display information to be displayed on the output unit 101. More specifically, in the case where it is recognized that a predetermined action of the predetermined object has been detected on the basis of the information acquired from the input analysis unit 113, the output control unit 115 may control the information amount of display information to be displayed on the output unit 101. Note that an example of control over the information amount exerted by the output control unit 115 is as described earlier with reference to FIG. 2. In addition, another example of control over the information amount exerted by the output control unit 115 will be described later separately as variations and application examples.

Note that, in the case where the information amount of display information to be displayed on the output unit 101 is controlled, the output control unit 115 may return the information amount of display information to be displayed on the output unit 101 to the state before the control on the basis of a predetermined trigger. As a specific example, in the case where a certain time period has elapsed since the information amount of display information to be displayed on the output unit 101 is controlled, the output control unit 115 may return the information amount of display information to be displayed on the output unit 101 to the state before the control, in addition, as another example, in the case where a state where a predetermined action of the predetermined object is not detected continues for a certain time period or longer after controlling the information amount of display information to be displayed on the output unit 101, the output control unit 115 may return the information amount of display information to be displayed on the output unit 101 to the state before the control. Of course, the foregoing is merely an example, and in the case where the output control unit 115 controls the information amount of display information to be displayed on the output unit 101, a trigger for returning the information amount to the state before the control is not particularly limited.

Note that the above-described functional configuration of the information processing device 100 is merely an example, and the functional configuration of the information processing device 100 is not necessarily limited to the example shown in FIG. 3 alone. For example, at least some components (for example, the Output unit 101, the input unit 103, the sensing unit 105, and the like) among the respective components of the information processing device 100 shown in FIG. 3 may be externally attached to the outside of the information processing device 100. In addition, at least some components among the respective components of the information processing device 100 may be provided for an external device different from the information processing device 100. As a more specific example, at least some components in the processing unit 110 or the processing unit 110 as a whole may be provided for an external device such as a server connected to the information processing device 100 via a network.

An example of the functional configuration of the information processing device 100 according to the present embodiment has been described above with reference to FIG. 3.

<<3. Processing>>

Figure 4:
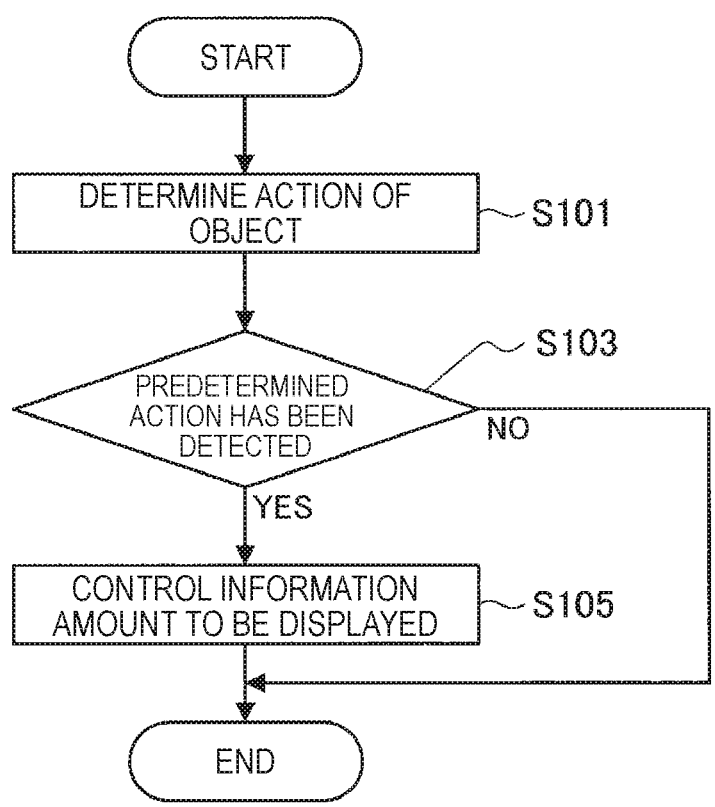
FIG. 4 is a flowchart showing an example of a flow of sequential processing of the information processing device according to the embodiment.

Subsequently, an example of a flow of sequential processing of the information processing device 100 according to the present embodiment will be described with reference to FIG. 4, particularly paying attention to control over the information amount of display information to be displayed on the output unit 101 in accordance with a determination result of an action of a predetermined object. FIG. 4 is a flowchart showing an example of a flow of sequential processing of the information processing device according to the present embodiment.

Specifically, in the case where the user performs a manipulation on the predetermined input unit 103, the information processing device 100 (the input analysis unit 113) acquires control information indicating an input result based on the manipulation from the input unit 103. Accordingly, the information processing device 100 recognizes contents of the manipulation performed by the user on the input unit 103. In addition, by acquiring context information indicating various states or situations from the sensing unit 313, the information processing device 100 may recognize the states or situations. Then, the information processing device 100 recognizes contents of the manipulation performed by the user and a change in various states or situations, and in accordance with the recognition result, determines an action of a predetermined object (for example, an action of the user) (S101).

Then, in the case where a predetermined action of a predetermined object has been detected (S103, YES), the information processing device 100 (the output control unit 115) controls the information amount of display information to be displayed on the output unit 101. As a specific example, assume that, in accordance with at least any of the number, frequency, or manipulation amount of scroll manipulations on the predetermined input unit 103 performed by the user, the information processing device 100 has detected an action related to a search for a desired piece of display information performed by the user. In this case, the information processing device 100 may increase the number of pieces of display information to be displayed on the output unit 101 by restricting the size of each piece of display information, as shown in the right drawing in FIG. 2, for example. Accordingly, it is possible to further improve efficiency of searching for a desired piece of display information among sequential pieces of the display information.

On the other hand, in the case where a predetermined action of a predetermined object is not detected (S103, NO), the information processing device 100 (the output control unit 115) does not need to control the information amount of display information to be displayed on the output unit 101 indicated by reference character S105. In addition, in the case where the information amount of display information to be displayed on the output unit 101 is controlled, the information processing device 100 may return the information amount of display information to be displayed on the output unit 101 to the state before the control on the basis of a predetermined trigger.

An example of a flow of sequential processing of the information processing device 100 according to the present embodiment has been described above with reference to FIG. 4, particularly paying attention to control over the information amount of display information to be displayed on the output unit 101 in accordance with a determination result of an action of a predetermined object.

<<4. Variations>>

Subsequently, variations of the information processing device 100 according to the present embodiment will be described.

<4.1. Variation 1: Control Example for Information Amount>

First, as Variation 1, another example of a method of controlling the information amount of display information to be displayed on the output unit 101 will be described. As described earlier, by restricting the size of display information to be displayed on the output unit 101, for example, the information processing device 100 according to the present embodiment increases the number of pieces of display information to be displayed in the display area of the output unit 101, and improves perspicuity of the display information displayed on the output unit. On the other hand, the method is not particularly limited as long as it is possible to increase the number of pieces of display information to be displayed in the display area of the output unit 101.

Figure 5:
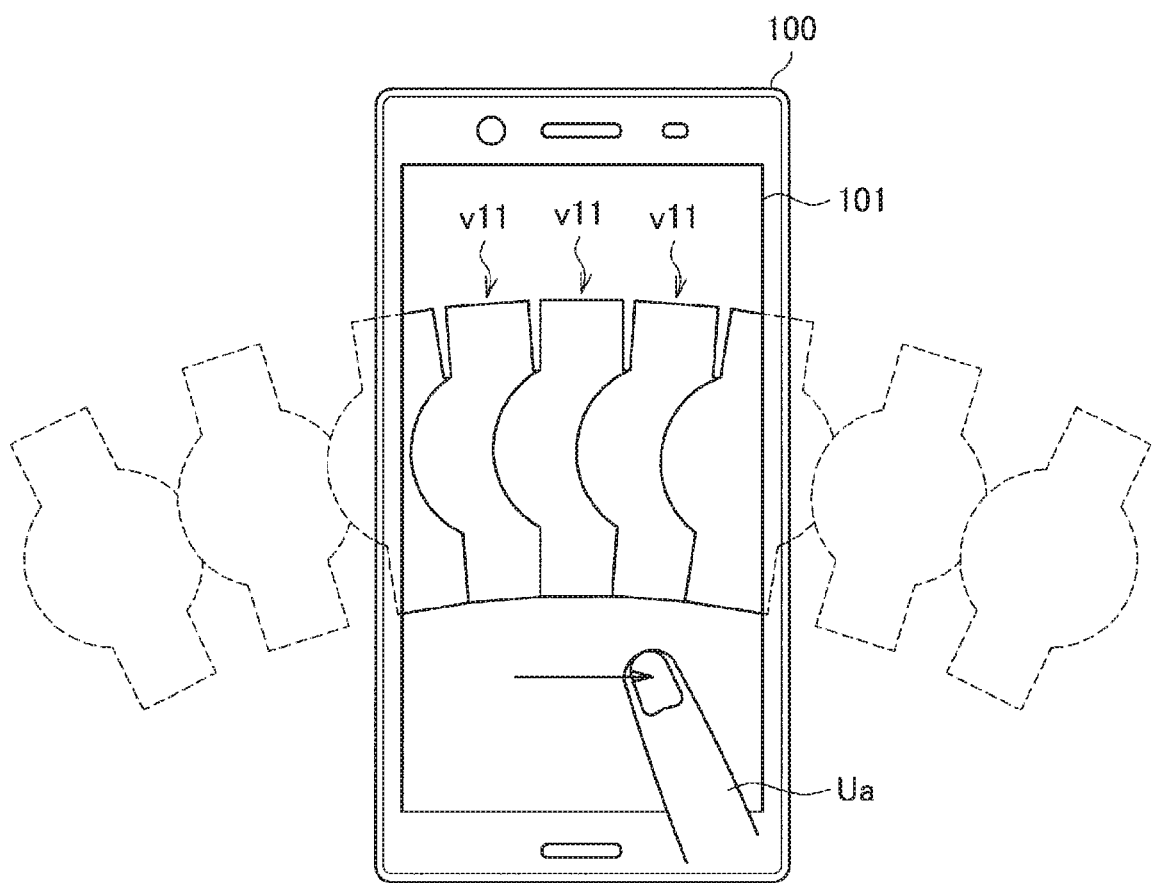
FIG. 5 is an explanatory diagram for describing an overview of an information processing device according to Variation 1 of the embodiment.

For example, FIG. 5 is an explanatory diagram for describing an overview of the information processing device 100 according to Variation 1 of the present embodiment, and shows an example of a method of controlling the information amount of display information to be displayed on the output unit 101 by the information processing device 100. Specifically, in the example shown in FIG. 5, the information processing device 100 causes each piece of the display information v11 to be displayed on the output unit 101 with another piece of the display information v11 superimposed on at least a part of each piece of the display information v11 to be displayed on the output unit 101. At this time, it is desirable that each of the plurality of pieces of the display information v11 displayed on the output unit 101 is displayed such that at least a part is exposed (that is, such that another piece of the display information v11 is not superimposed). With such control, recognizability is restricted since at least a part of each of the plurality of pieces of the display information v11 is shielded with another piece of the display information v11, but it is possible to cause a larger number of pieces of the display information v11 to be displayed on the output unit 101 without restricting the size of each piece of the display information v11.

Note that the above-described example is merely an example, and as long as it is possible to control the information amount such that efficiency of searching for a desired piece of display information among sequential pieces of display information is further improved (for example, perspicuity of a plurality of pieces of display information is further improved), the method is not necessarily limited to the example described above as an embodiment or the example described with reference to FIG. 3.

In addition, in the above-described embodiment, the example of switching between two states of a state at the normal time (for example, at the normal scroll time) and a state in which the information amount is controlled (for example, at high-speed scrolling) has been described, for example, whilst it is not necessarily limited to switching between the two states. For example, the information processing device 100 may further restrict the size of display information to be displayed on the output unit 101 as at least any of the number, frequency, or manipulation amount of predetermined manipulations increases to exert control such that a larger number of pieces of display information are displayed.

As a more specific example, attention will be paid to the case where a device capable of detecting a pressure of a touch made by the user, such as a pressure-sensitive sensor, is applied as the input unit 103. In this case, the information processing device 100 may control the information amount of display information to be displayed on the output unit 101 in accordance with the magnitude of a pressure of a touch made by the user (that is, the depth of pressing by the touch). More specifically, the information processing device 100 may exert control such that, as the pressure of a touch made by the user becomes larger (that is, as pressing by the touch becomes deeper), a larger nwnher of pieces of display information are displayed on the output unit 101.

Another example of a method of controlling the information amount of display information to be displayed on the output unit 101 has been described above as Variation 1 with reference to FIG. 5.

<4.2. Variation 2: Example of UI>

Subsequently, another example of a UI provided by the information processing device 100 according to the present embodiment will be described as Variation 2.

Figure 6:
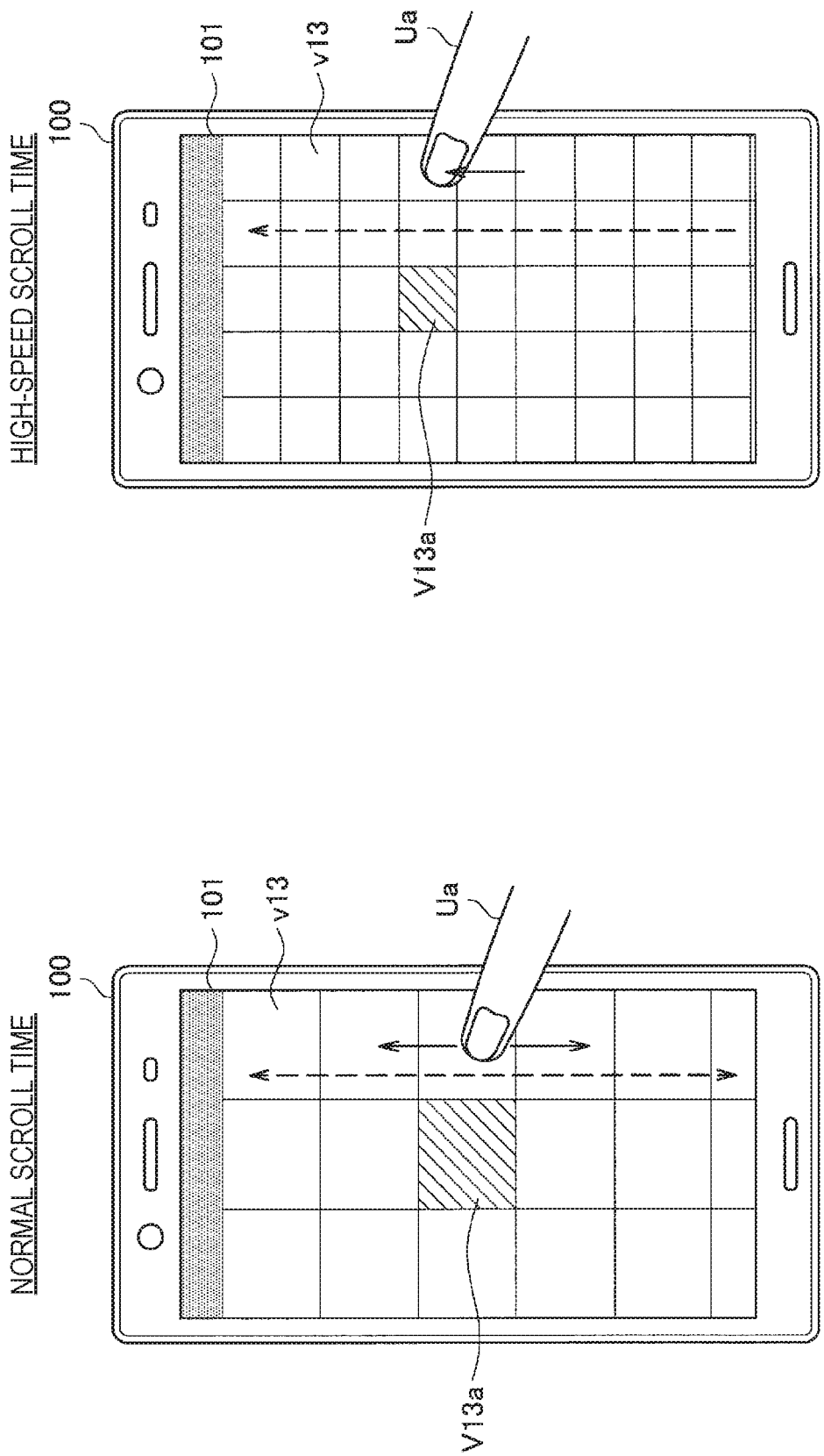
FIG. 6 is an explanatory diagram for describing an overview of a UI provided by an information processing device according to Variation 2 of the embodiment.

For example, FIG. 6 is an explanatory diagram for describing an overview of a UI provided by the information processing device 100 according to Variation 2 of the present embodiment. In the example shown in FIG. 6, the case of arranging thumbnails of content of still images or moving images along each of orthogonal two axes (that is, arranging in a matrix) to present a list of the content to the user is assumed. More specifically, in the example shown in FIG. 6, the information processing device 100 arranges display information v13 associated with content such as images (for example, thumbnails of the images) in a matrix along each of the vertical direction and lateral direction in the display area of the output unit 101, and causes at least some pieces of the display information v13 among the arranged sequential pieces of the display information v13 to be displayed on the output unit 101. In addition, when a scroll manipulation performed by the manipulation body Ua is accepted, the information processing device 100 causes the sequential pieces of the display information v13 to be scrolled along at least any of the vertical direction or lateral direction relatively with respect to the display area of the output unit 101. For example, in the example shown in FIG. 6, the information processing device 100 causes the sequential pieces of the display information v13 to be scrolled along the vertical direction relatively with respect to the display area of the output unit 101. With such control, even under such a situation where all pieces of the display information v13 (in other words, content) to be selection targets do not fall within the screen, for example, it is possible for the user to cause a desired piece of the display information v13 to be displayed on the output unit 101 by appropriately scrolling the sequential pieces of the display information v13. That is, it is possible for the user to search for and select a desired piece of content from among the sequential pieces of content to be selection targets.

On the basis of the configuration as described above, similarly to the information processing device 100 according to the aforementioned embodiment, the information processing device 100 according to Variation 2 recognizes (determines) an action of the user, and in accordance with a recognition result, controls the information amount of display information to be presented to the user via the output unit 101.

More specifically, the information processing device 100 controls the display mode of the display information v13 at the normal time (at the normal scroll time) such that the size of the display information v13 becomes larger, as shown in the left drawing in FIG. 6. In this case, since the proportion of each piece of the display information v13 occupying the display area of the output unit 101 becomes larger, recognizability of each piece of the displayed display information v13 is improved, while the number of pieces of the display information v13 that can be displayed in the display area is restricted.

In contrast to this, the information processing device 100 recognizes that it is a situation where the user is searching for a desired piece of the display information v13 among the sequential pieces of the display information v13 on the basis of contents of a manipulation performed by the user and a recognition result of a change in various states or situations. In such a case, the information processing device 100 controls the display mode of the display information v13 such that the size of each piece of the display information v13 decreases, for example, and causes a larger number of pieces of the display information v13 to be displayed on the output unit 101. For example, in the example shown on the right side in FIG. 6, by restricting the size of each piece of the display information v13, the information processing device 100 causes a larger number of pieces of the display information v13 to be displayed along each of the vertical direction and lateral direction than in the left drawing. Since this allows the user to search for a desired piece of the display information v13 without involving a complicated manipulation, improvement in efficiency of searching for a desired piece of the display information v13 among the sequential pieces of the display information v13 is expected.

Note that the information processing device 100 may exert control such that screens are switched seamlessly by means of a so-called animation display when a transition is made from the state shown in the left drawing in FIG. 6 to the state shown in the right drawing, similarly to the example described with reference to FIG. 2. As a more specific example, in the example shown in FIG. 6, assume that the user is placing the line of sight at (for example, paying attention to) display information (content) indicated as a reference character v13a. At this time, when switching screens, the information processing device 100 may switch the screens seamlessly by means of an animation display that gives such an appearance impression that the field of view is enlarged centering on the display information v13a at which the user is placing the line of sight, for example. With such control, also in the case where the screen transitions as shown in FIG. 6 under a situation where the user is searching for a desired piece of the display information v13 while scrolling the sequential pieces of the display information v13 displayed in a grid, it is possible for the user to continue manipulating without losing sight of the display information v13a at which the user has been placing the line of sight. In this manner, since the state in which the user is glancing at a desired piece of content (for example, the display information v13a) is maintained even if screens are switched, the need for the user to perform work such as moving the line of sight to search for the piece of content at which he/she has been glancing, for example, and by extension, the effect of lightening a burden on the user is also expected.

In addition, similarly to the example described with reference to FIG. 5, the information processing device 100 according to Variation 2 may superimpose another piece of the display information v13 on at least a part of each piece of the display information v13 to be displayed on the output unit 101 to control the information amount of display information to be displayed on the output unit 101.

Figure 7:
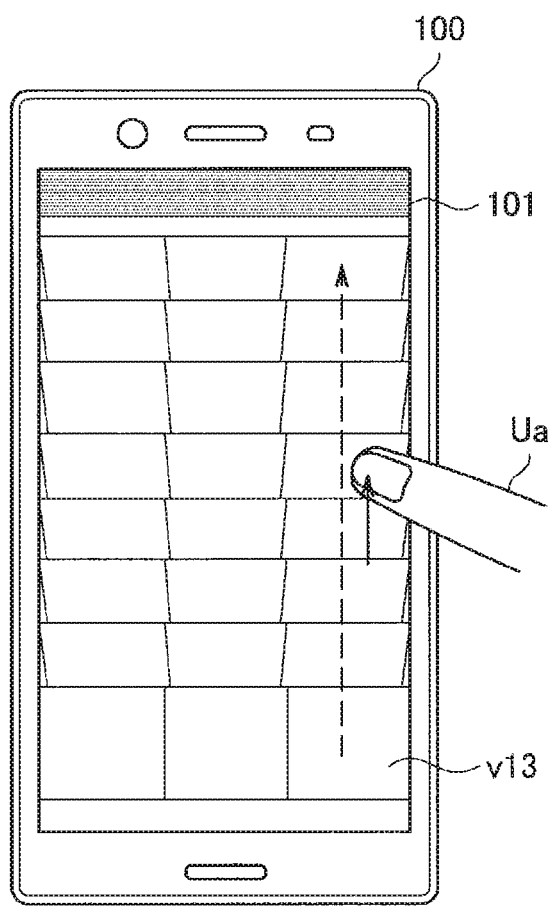
FIG. 7 is an explanatory diagram for describing another mode of the information processing device according to Variation 2 of the embodiment.

For example, FIG. 7 is an explanatory diagram for describing another mode of the information processing device 100 according to Variation 2 of the present embodiment. In the example shown in FIG. 7, regarding at least some pieces of the display information v13 among the sequential pieces of the display information v13, On a lower part of these pieces of the display information v13, an upper part of other pieces of the display information v13 positioned directly below is superimposed. With such control, in the example shown in FIG. 7, it is possible to cause a larger number of pieces of the display information v13 to be displayed along the vertical direction without restricting the size of each piece of the display information v13, and by extension, improvement in efficiency of searching for a desired piece of the display information v13 among the sequential pieces of the display information v13 performed by the user is expected. Note that the direction of superimposing other pieces of the display information v13 on at least some pieces of the display information v13 is not limited to the vertical direction alone as in the example shown in FIG. 7, but other pieces of the display information v13 may be superimposed on at least some pieces of the display information v13 along the lateral direction, for example.

In addition, in the case where the information amount of display information to be displayed on the output unit 101 is controlled, the information processing device 100 may present additional information together, or may separately control the display mode of at least some pieces of display information.

Figure 8:
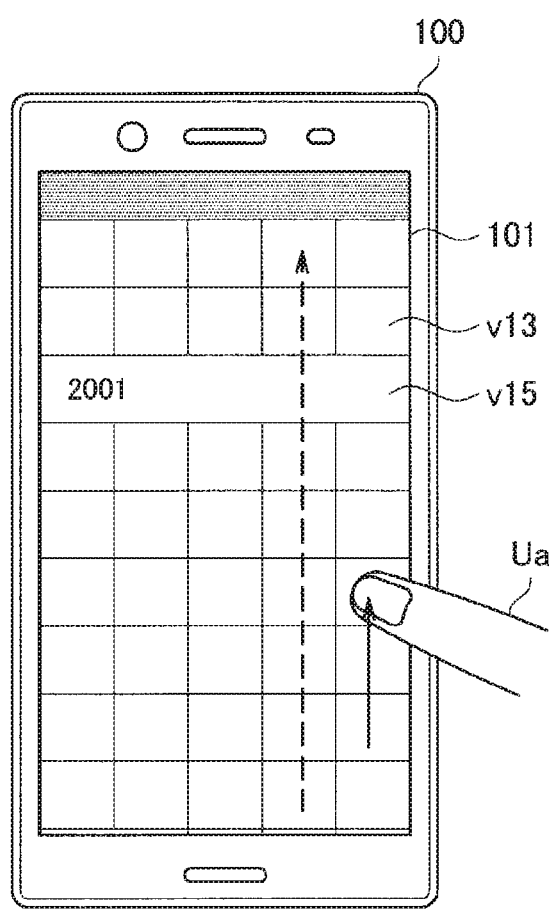
FIG. 8 is an explanatory diagram for describing another mode of the information processing device according to Variation 2 of the embodiment.

For example, FIG. 8 is an explanatory diagram for describing another mode of the information processing device 100 according to Variation 2 of the present embodiment. In the example shown in FIG. 8, in the case of increasing the number of pieces of the display information v13 to be displayed on the output unit 101 by restricting the size of the display information v13, a label or an index indicating the classification of the display information v13 being displayed on the output unit 101 is presented together as additional information v15.

As described earlier, in the case of restricting the size of display information to be displayed on the output unit 101, the proportion in which the display information occupies the display area of the output unit 101 is reduced, and therefore, it is possible to cause a larger number of pieces of display information to be displayed. On the other hand, by restricting the size of display information, there are cases in which recognizability of each piece of the display information is reduced, and by extension, the information amount of information that the display information presents to the user is restricted (for example, image resolution is reduced, or the like). Even under such a situation, by presenting the additional information v15 together as shown in FIG. 8, for example, the information processing device 100 is capable of assisting in a manipulation related to a selection of display information (content) performed by the user.

In addition, as another example, in the case of increasing the number of pieces of display information to be displayed on the output unit 101 by restricting the size of the display information, in accordance with an attribute of at least some pieces of display information displayed on the output unit 101, the information processing device 100 may control the color of the display information.

For example, in accordance with attribute information indicating the date and time associated with display information, the information processing device 100 may control the color of the display information. More specifically, as the date and time associated with the display information are older, the information processing device 100 may exert control such as reducing the chromaticity of the display information or changing the hue into a sepia tone or monochrome. In addition, as another example, in accordance with attribute information indicating the type of display information, the information processing device 100 may control the color of the display information. As a more specific example, the information processing device 100 may cause display information example, a thumbnail) corresponding to an image obtained by imaging a person and display information corresponding to an image obtained without imaging a person to be displayed in different colors.

With such control, the information processing device 100 is capable of assisting in a manipulation related to a selection of display information (content) made by the user even under such a situation where, by restricting the size of display information, recognizability of the display information is reduced.

Note that the above-described example is merely an example, and the information displayed additionally and the method of controlling the display mode of each piece of display information are not particularly limited. In addition, the display of additional information and control over the display mode (for example, color control) of each piece of display information described above are also applicable to the example described with reference to FIG. 1 and FIG. 2, for example.

Another example of a UI provided by the information processing device 100 according to the present embodiment is described above as Variation 2 with reference to FIG. 6 to FIG. 8.

<<5. Application Examples>>

Subsequently, as application examples of the information processing device 100 according to the present embodiment, application examples for devices other than a smartphone and a tablet terminal will be described.

<5.1. Application Example 1: Application Example for Wearable Terminal>

First, as a first application example (hereinafter also referred to as "Application example 1") of the present embodiment, an application example for an information processing device smaller than a smartphone and including a display having a substantially square shape, like a so-called wearable terminal, will be described. Note that, in the following description, the information processing device according to Application example 1 may be referred to as an "information processing device 200" so as to be distinguished from the information processing device according to the aforementioned embodiment.

Figure 9:
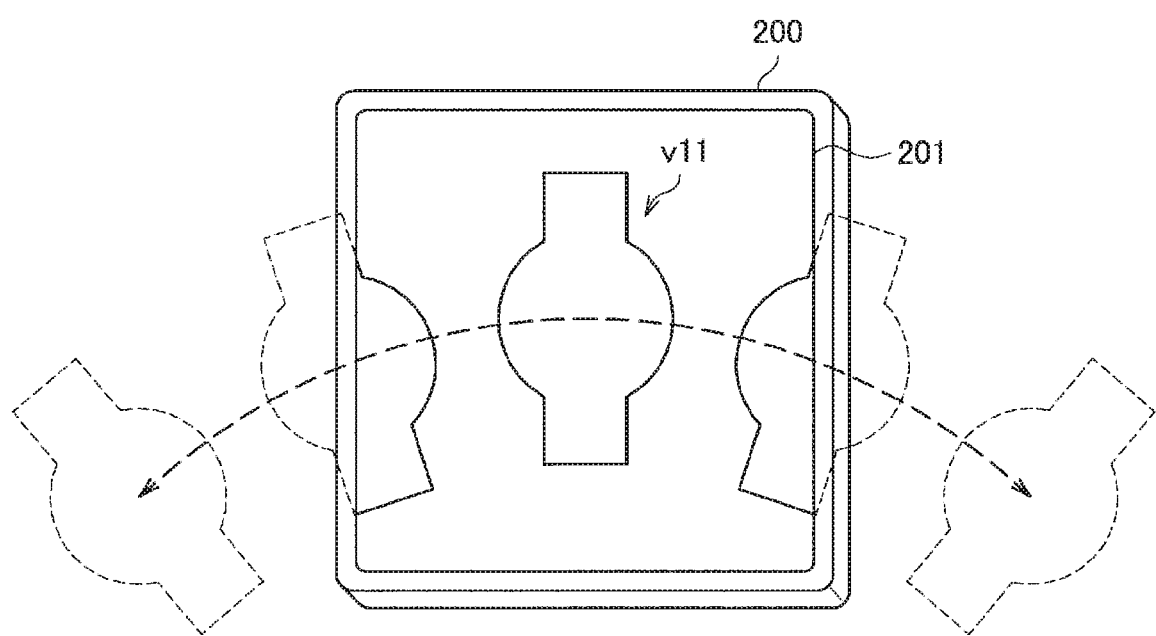
FIG. 9 is an explanatory diagram for describing a first application example of the information processing device according to the embodiment.

For example, FIG. 9 is an explanatory diagram for describing the first application example for the information processing device according to the present embodiment. The example shown in FIG. 9 shows an example of the case where at least some pieces of the display information v11 among sequential pieces of the display information v11 arranged along an arcuate track are displayed on an output unit 201 of the information processing device 200, similarly to the example shown in FIG. 1 and FIG. 2. In this case, when a scroll manipulation from the user is accepted, for example, the information processing device 200 causes the sequential pieces of the display information v11 to be scrolled along an arcuate track relatively with respect to a display area of the output unit 201, similarly to the example shown in FIG. 1 and FIG. 2. Accordingly, the display information v11 to be displayed on the output unit 201 will be sequentially changed.

In addition, the information processing device 200 may determine an action of a predetermined object, and in accordance with the determination result, may control the information amount of display information to be displayed on the output unit 201, similarly to the information processing device 100 according to the aforementioned embodiment. As a specific example, the information processing device 200 may cause a larger number of pieces of the display information v11 to be displayed on the output unit 201 by restricting the size of the display information v11, similarly to the example described with reference to FIG. 2. In addition, as another example, the information processing device 200 may cause a larger number of pieces of the display information v11 to be displayed on the output unit 201 by superimposing another piece of the display information v11 on at least a part of each piece of the display information v11 to be displayed on the output unit 201, similarly to the example described with reference to FIG. 5.

In addition, in the information processing device 200, the extent, width, and the like of the display area of the output unit 201 are restricted as compared to the information processing device 100 implemented as a smartphone, a tablet terminal, or the like. Therefore, the information processing device 200 may cause a piece of the display information v11 positioned closer to the center of the display area, for example, among pieces of the display information v11 displayed on the output unit 201, for example, to be displayed in a size larger than the other pieces of the display information v11.

Figure 10:
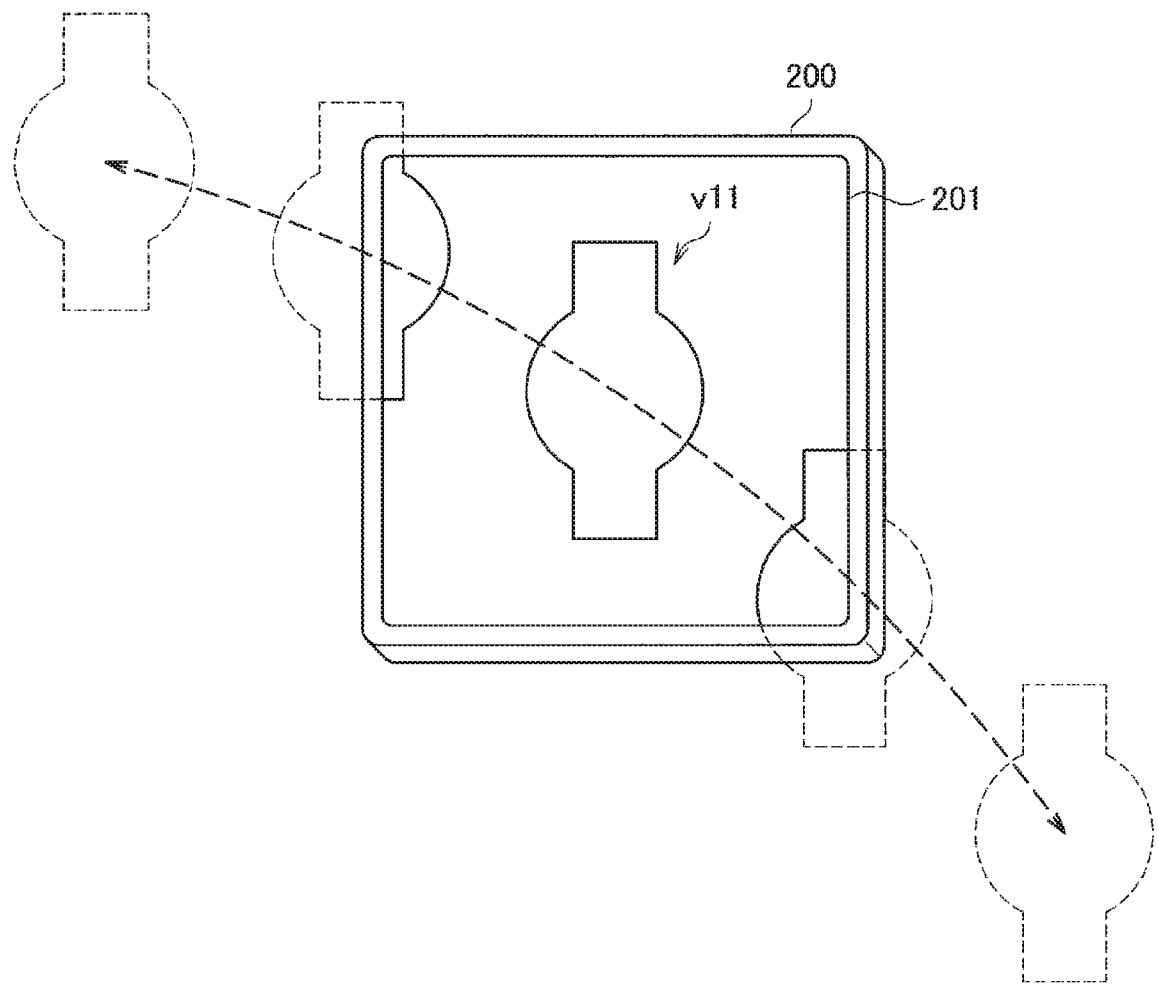
FIG. 10 is an explanatory diagram for describing another mode of the first application example of the information processing device according to the embodiment.

In addition, FIG. 10 is an explanatory diagram for describing another mode of the first application example of the information processing device according to the present embodiment. In the example shown in FIG. 10, at least some pieces of the display information v11 among the sequential pieces of the display information v11 are displayed on the output unit 201 such that an arcuate track on which the sequential pieces of the display information v11 are arranged is positioned along a slanting direction (for example, the diagonal direction) of the display area of the Output unit 201. In this case, when a scroll manipulation performed by the user is accepted, for example, the information processing device 200 causes the sequential pieces of the display information v11 to be scrolled along the slanting direction of the display area relatively with respect to the display area of the output unit 201.

With such a configuration, in the example shown in FIG. 10, as a track along which the sequential pieces of the display information v11 are scrolled in the display area, it is possible to ensure a track longer than in the example described with reference to FIG. 9. Therefore, in the example shown in FIG. 10, it is possible to improve operability of a scroll manipulation even under a situation where the display area of the output unit 201 is restricted further.

Figure 11:
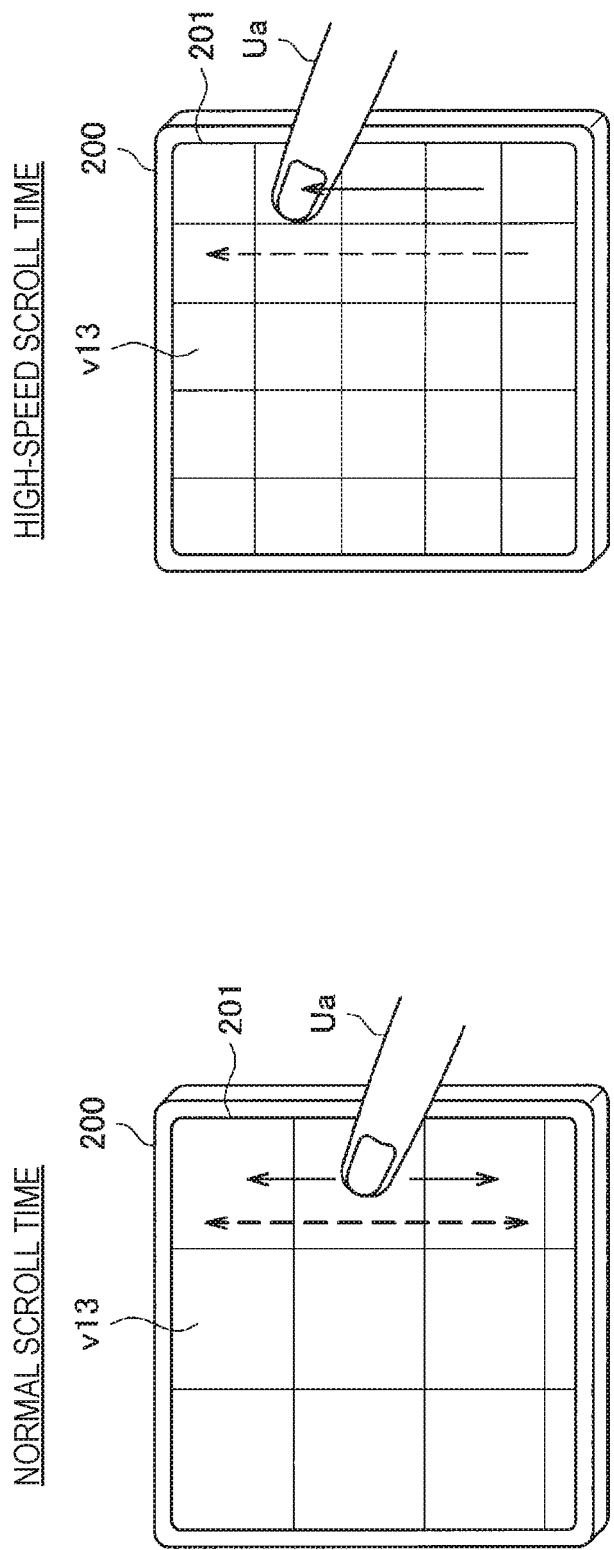
FIG. 11 is an explanatory diagram for describing another mode of the first application example of the information processing device according to the embodiment.

In addition, FIG. 11 is an explanatory diagram for describing another mode of the first application example of the information processing device according to the present embodiment. The example shown in FIG. 11 shows an example of the case where at least some pieces of the display information v13 among the sequential pieces of the display information v13 arranged along each of orthogonal two axes are displayed on the output unit 201 of the information processing device 200, similarly to the example described with reference to FIG. 6, In this case, when a scroll manipulation performed by the user is accepted, for example, the information processing device 200 causes the sequential pieces of the display information v13 to be scrolled along at least any of the two axes relatively with respect to the display area of the output unit 201, similarly to the example shown in FIG. 6. Accordingly, the display information v13 to be displayed on the output unit 201 will be sequentially changed.

In addition, the information processing device 200 may determine an action of a predetermined object, and in accordance with the determination result, may control the information amount of display information to be displayed on the output unit 201, similarly to the information processing device 100 according to the aforementioned embodiment. As a specific example, the information processing device 200 may cause a larger number of pieces of the display information v13 to be displayed on the output unit 201 by restricting the size of the display information v13, similarly to the example described with reference to FIG. 6.

In addition, as another example, the information processing device 200 may cause a larger number of pieces of the display information v13 to be displayed on the output unit 201 by superimposing another piece of the display information v13 on at least a part of each piece of the display information v13 to be displayed on the output unit 201, similarly to the example described with reference to FIG. 7. Note that, in the case of controlling the information amount of display information to be displayed on the output unit 201 (that is, switching screens), the information processing device 200 may exert control such that screens are switched seamlessly by means of an animation display, similarly to the information processing device 100 according to the aforementioned embodiment. As a specific example, when switching the screens, the information processing device 200 may switch the screens seamlessly by means of an animation display that gives such an appearance impression that the field of view is enlarged centering on a piece of content at which the user is placing the line of sight.

In addition, in the case of increasing the number of pieces of display information to be displayed on the output unit 201, the information processing device 200 may present a label or an index indicating the classification of display information displayed on the output unit 201 together as additional information, similarly to the example described with reference to FIG. 8. In addition, in the case of increasing the number of pieces of display information to be displayed on the output unit 201, the information processing device 200 may control the color of the display information in accordance with an attribute of at least some pieces of the display information displayed on the output unit 201.

As Application example 1 of the present embodiment, an application example for an information processing device smaller than a smartphone and including a display having a substantially square shape like a wearable terminal has been described above with reference to FIG. 9 and FIG. 10.

<5.2. Application Example 2: Application Example for Large Display>

Subsequently, an application example for an information processing device including a relatively large display will be described as a second application example (hereinafter also referred to as "Application example 2") of the present embodiment. Examples of an information processing device including a relatively large display include a so-called television receiver and a terminal device for displaying electronic advertisements. Note that, in the present description, the case applied to an information processing device implemented as a television receiver will be described as an example, whilst the type of the information processing device is not limited. In addition, in the following description, the information processing device according to Application example 2 may be referred to as an "information processing device 300" so as to be distinguished from the information processing devices according to the aforementioned embodiment and other application examples.

Figure 12:
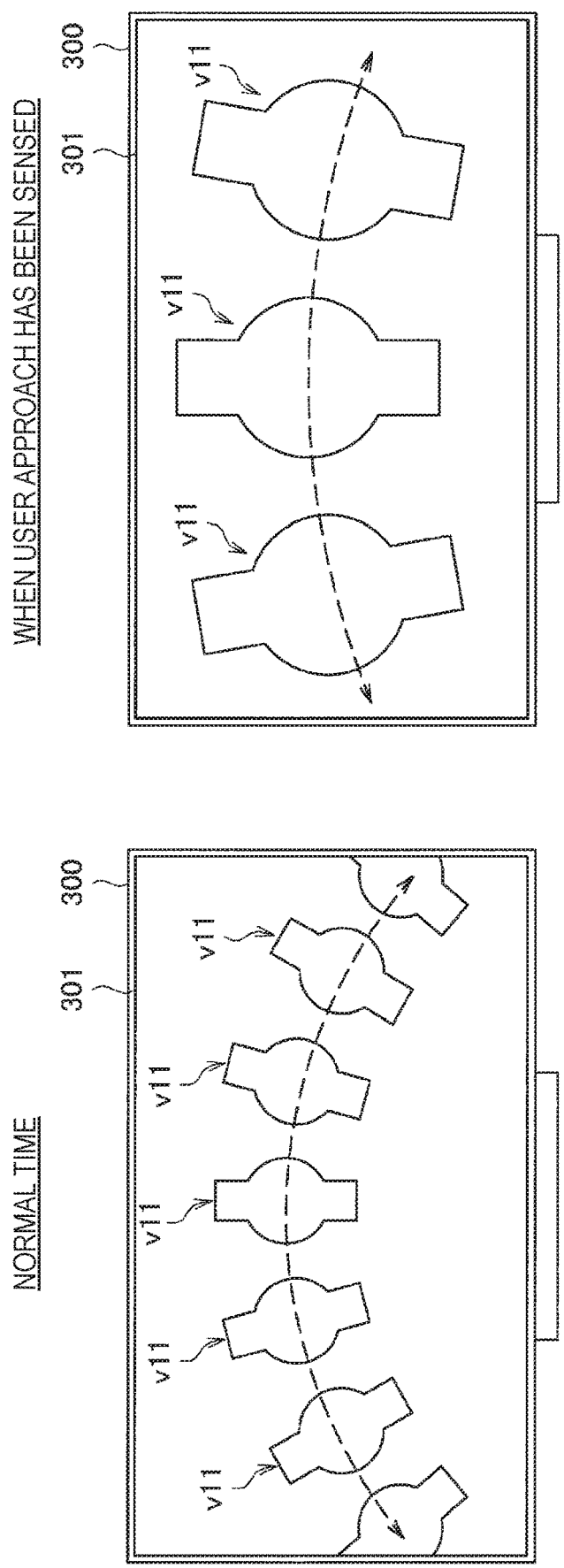
FIG. 12 is an explanatory diagram for describing a second application example of the information processing device according to the embodiment.

For example, FIG. 12 is an explanatory diagram for describing the second application example of the information processing device according to the present embodiment. The example shown in FIG. 12 shows an example of the case where at least some pieces of the display information v11 among the sequential pieces of the display information v11 arranged along an arcuate track are displayed on an output unit 301 of the information processing device 300, similarly to the example shown in FIG. 1 and FIG. 2. In this case, when a scroll manipulation performed by the user is accepted, for example, the information processing device 300 causes the sequential pieces of the display information v11 to be scrolled along the arcuate track relatively with respect to a display area of the output unit 301, similarly to the example shown in FIG. 1 and FIG. 2. Accordingly, the display information v11 displayed on the output unit 301 will be sequentially changed.

In addition, the information processing device 300 senses an approach of the user to the output unit 301 with a sensing unit such as a human presence sensor, for example, and in accordance with the sensing result, controls the information amount of display information to be displayed on the output unit 301.

As a specific example, in the example shown in FIG. 12, at the normal time when the user has not approached the output unit 301, the information processing device 300 restricts the size of the display information v11, and causes a larger number of pieces of the display information v11 to be displayed on the output unit 301, as shown in the left drawing. Accordingly, at the normal time, improvement in perspicuity of the display information v11 displayed on the output unit 301 is expected, for example. In contrast to this, in the case where an approach of the user is sensed, the information processing device 300 further improves recognizability of the display information v11. Specifically, the information processing device 300 exerts control such that the size of the display information v11 displayed on the output unit 301 becomes larger, as shown in the right drawing. Accordingly, the number of pieces of the display information v11 displayed on the output unit 301 is restricted, while it is possible to further improve recognizability of each piece of the display information v11. Note that, in the case of controlling the information amount of display information to be displayed on the output unit 301 (that is, switching screens) similarly to the information processing devices according to the aforementioned embodiment and other application examples, the information processing device 300 may exert control such that screens are switched seamlessly by means of an animation display. As a specific example, when switching the screens, the information processing device 300 may switch the screens seamlessly by means of an animation display that gives such an appearance impression that the field of view is enlarged centering on a piece of content at which the user is placing the line of sight.

In this manner, in the example shown in FIG. 12, under a situation where the user is paying attention to display information displayed on the output unit 301 such as the case where the user has approached the output unit 301, the information processing device 300 exerts control such that recognizability of each piece of the display information v11 is improved further.

Note that the foregoing is merely an example, and a trigger for the information processing device 300 to control the information amount of display information to be displayed on the output unit 301 is not particularly limited. For example, in the case where a predetermined manipulation (for example, a scroll manipulation) is accepted from the user similarly to the aforementioned embodiment and other application examples, the information processing device 300 may control the information amount of display information to be displayed on the output unit 301. Note that, in this case, the configuration of an input unit that accepts a manipulation performed by the user is not particularly limited. For example, on the basis of a predetermined manipulation input via an input device such as a remote controller, the information processing device 300 may control the information amount of display information to be displayed on the output unit 301. In addition, as another example, the information processing device 300 may control the information amount of display information to be displayed on the output unit 301 on the basis of a sensing result of another state different from an approach of the user. Note that, in this case, the information processing device 300 may be capable of acquiring a sensing result from a sensing unit (for example, a sensor or the like) in accordance with a sensing target. As a specific example, the information processing device 300 may sense a situation where the user is paying attention to display information displayed on the output unit 301 by analyzing an imaging result of an image of an external environment captured by the imaging unit, and in accordance with the sensing result, may control the information amount of display information to be displayed on the output unit 301. In addition, as another example, in the case where the operation mode transitions from a predetermined mode to another mode, the information processing device 300 may control the information amount of display information to be displayed on the output unit 301. Note that the foregoing applies not only to the information processing device 300 according to the present application example, but also to the information processing devices according to the aforementioned embodiment and other application examples.

Figure 13:
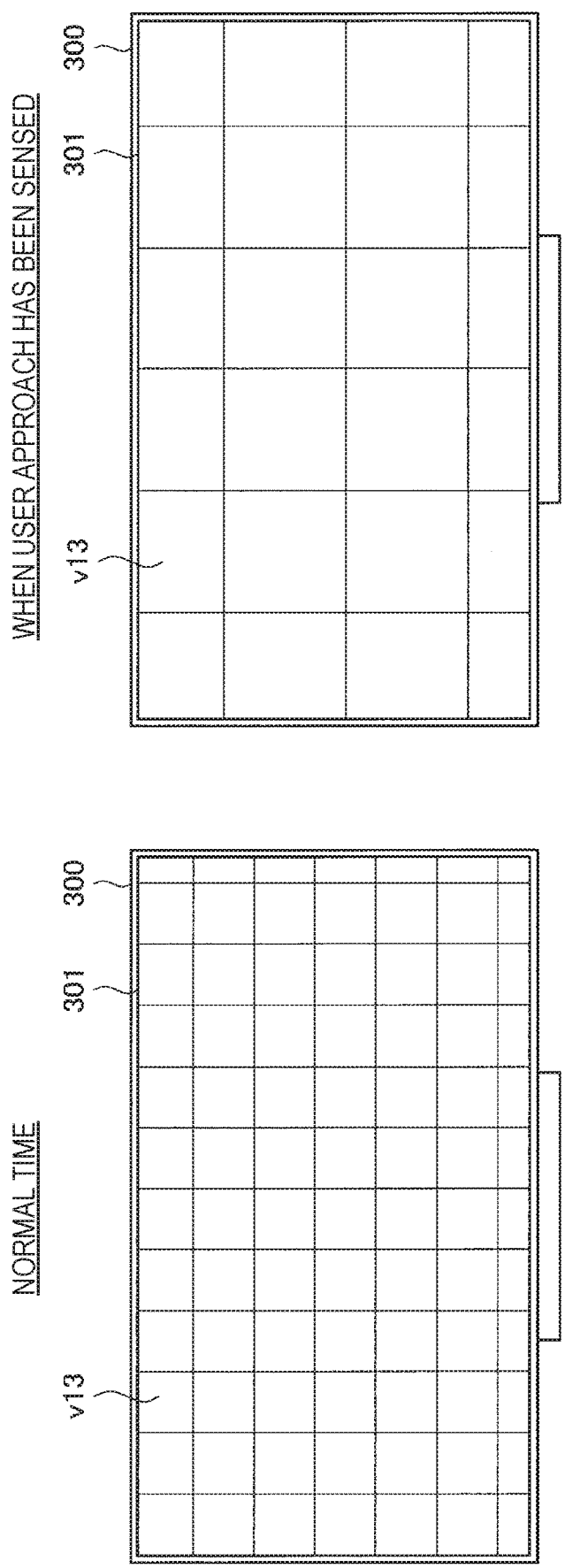
FIG. 13 is an explanatory diagram for describing another mode of the second application example of the information processing device according to the embodiment.

In addition, FIG. 13 is an explanatory diagram for describing another mode of the second application example of the information processing device according to the present embodiment. The example shown in FIG. 13 shows an example of the case where at least some pieces of the display information v13 among the sequential pieces of the display information v13 arranged along each of orthogonal two axes are displayed on the output unit 301 of the information processing device 300, similarly to the example described with reference to FIG. 6. In this case, when a scroll manipulation performed by the user is accepted, for example, similarly to the example shown in FIG. 6, the information processing device 300 causes the sequential pieces of the display information v13 to be scrolled along at least any of the two axes relatively with respect to the display area of the output unit 301. Accordingly, the display information v13 displayed on the output unit 301 will be sequentially changed.

In addition, the information processing device 300 may sense an approach of the user, and in accordance with the sensing result, may control the information amount of display information to be displayed on the output unit 301.

As a specific example, in the example shown in FIG. 13, at the normal time when the user has not approached the output unit 301, the information processing device 300 restricts the size of the display information v13, and causes a larger number of pieces of the display information v13 to be displayed on the output unit 301, as shown in the left drawing. In contrast to this, in the case where an approach of the user is sensed, the information processing device 300 exerts control such that the size of the display information v13 displayed on the output unit 301 becomes larger, as shown in the right drawing. Accordingly, the number of pieces of the display information v13 displayed on the output unit 301 is restricted, while it is possible to further improve recognizability of each piece of the display information v13.

In addition, in the case of causing a larger number of pieces of display information to be displayed on the output unit 301, the information processing device 300 may present a label or an index indicating the classification of display information displayed on the output unit 301 together as additional information, similarly to the example described with reference to FIG. 8. In addition, in the case of causing a larger number of pieces of display information to be displayed on the output unit 301, in accordance with an attribute of at least some pieces of the display information displayed on the output unit 301, the information processing device 300 may control the color of the display information.

As Application example of the present embodiment, an application example for an information processing device including a relatively large display has been described above with reference to FIG. 12 and FIG. 13.

<5.3. Application Example 3: Application Example for Device Whose Display Area is Restricted Further>

Subsequently, as a third application example (hereinafter also referred to as "Application example 3") of the present embodiment, an application example for a device whose display area is restricted further will be described particularly paying attention to the case where information that can be displayed in the display area is restricted to character information of about one to several lines. Examples of a device whose display area is restricted further include a stick type music player and a band type wearable terminal. Note that, in the present description, the case of applying to an information processing device implemented as a stick type music player will be described as an example, whilst the type of the information processing device is not limited. In addition, in the following description, the information processing device according to Application example 3 may be referred to as an "information processing device 400" so as to be distinguished from the information processing devices according to the aforementioned embodiment and other application examples.

For example, FIG. 14 is an explanatory diagram for describing the third application example of the information processing device according to the present embodiment. Specifically, the information processing device 400 has an elongated housing, and the housing is provided with an output unit 401 having a display area of a slender shape along the elongated direction. The output unit 401 is configured such that a line of character information can be output as display information along the elongated direction. In addition, the display area of the output unit 401 may be implemented as a touch panel. In this case, the user can manipulate the information processing device 400 by making a touch manipulation on display information displayed on the output unit 401. In addition, the information processing device 400 may include an input unit for manipulating the information processing device 400, such as a button or a dial.

In the example shown in FIG. 14, the information processing device 400 causes at least some pieces of the display information v21 among sequential pieces of the display information v21 arranged along the elongated direction of the display area of the output unit 401 to be displayed on the output unit 401. As a more specific example, the information processing device 400 causes character information (for example, the names of artists) associated with music data to be played to be displayed as the display information v21. In addition, when a scroll manipulation performed by the user is accepted, for example, the information processing device 400 causes the sequential pieces of the display information v21 to be scrolled along the elongated direction of the display area relatively with respect to the display area of the output unit 401. Accordingly, the display information v21 to be displayed on the output unit 401 will be sequentially changed.

In addition, the information processing device 400 may determine an action of a predetermined object, and in accordance with the determination result, may control the information amount of display information to be displayed on the output unit 401, similarly to the information processing devices according to the aforementioned embodiment and other application examples. For example, in the example shown in FIG. 14, at the normal time (for example, at the normal scroll time), the information processing device 400 causes each piece of the display information v21 to be displayed as much as possible within the range of a predetermined number of characters, as shown in the upper drawing. In contrast to this, in the case where an action of a predetermined object is sensed (for example, at high-speed scrolling), the information processing device 400 causes a larger number of pieces of display information to be displayed on the output unit 401 by restricting the number of characters of each piece of display information to be displayed on the output unit 401. For example, in the example shown in FIG. 14, the information processing device 400 causes an index indicating the classification of each piece of the display information v21 to be displayed on the output unit 401 instead of the display information v21 as display information v23 having a smaller number of characters than the display information v21, as shown in the lower drawing. Accordingly, a larger number of pieces of display information than at the normal time are displayed on the output unit 401. Note that, in the case of controlling the information amount of display information to be displayed on the output unit 401 (that is, switching screens), the information processing device 400 may exert control such that screens are switched seamlessly by means of an animation display, similarly to the information processing devices according to the aforementioned embodiment and other application examples. As a specific example, when switching the screens, the information processing device 400 may switch the screens seamlessly by means of an animation display that gives such an appearance impression that the field of view is enlarged centering on a piece of content at which the user is placing the line of sight.

Note that the foregoing is merely an example, and the method of controlling the information amount of display information to be displayed on the output unit 401 is not limited to the example shown in FIG. 14. As a specific example, by causing only at least partial character information (for example, character information of several characters from the beginning) of character information displayed as each piece of the display information v21 to be displayed, the information processing device 400 may restrict the number of characters displayed as the display information v21. With such control, the information processing device 400 can cause a larger number of pieces of the display information v21 to be displayed on the output unit 401.

As Application example 3 of the present embodiment, an application example for a device whose display area is restricted further is described above with reference to FIG. 14 particularly paying attention to the case where information that can be displayed in the display area is restricted to character information of about one to several lines.

<5.4. Application Example 4: Application Example for Vehicle-Mounted System>

Subsequently, as a fourth application example (hereinafter also referred to as "Application example 4") of the present embodiment, an example of the case where the information processing device according to the present embodiment is applied to a vehicle-mounted system will be described. Note that, in the present description, description will be given paying attention to the case of, using at least a part of the front glass, for example, as an information display area, causing various types of information, such as a map, to be displayed (or projected) on the display area like a so-called head-up display or the like to present the information to the user. In addition, in the following description, the information processing device according to Application example 4 may be referred to as an "information processing device 500" so as to be distinguished from the information processing devices according to the aforementioned embodiment and other application examples.

For example, FIG. 15 is an explanatory diagram for describing the fourth application example of the information processing device according to the present embodiment. Specifically, using at least a partial area of the front glass of a vehicle as an output unit 501, the information processing device 500 causes display information to be displayed (or projected) on the output unit 501 to present information to the user. In addition, in the example shown in FIG. 15, the information processing device 500 causes map information that a so-called navigation device presents to be displayed on the output unit 501 as display information v31.

In addition, on the basis of a sensing result obtained by a sensing unit such as a sensor provided for a vehicle, for example, the information processing device 500 according to the present embodiment may determine an action of the vehicle (that is, an object), and in accordance with the determination result, may control the information amount of display information to be displayed on the output unit 501.

For example, in the example shown in FIG. 15, the information processing device 500 controls the information amount of display information (for example, the display information v31 which is map information) to be displayed on the output unit 501 in accordance with the traveling state of the vehicle. More specifically, in the state where the vehicle is at a stop, the information processing device 500 causes display information v31a in which map information about a wider range is presented to be displayed on the output unit 501 in a larger size, as shown in the upper drawing. In addition, at this time, the information processing device 500 may present a plurality of route candidates as information about a route to a destination presented in the map information. With such control, the information amount of information presented as map information on the output unit 501 (that is, the information amount of information that the display information v31 has) is improved, and recognizability of the map information is also improved.

On the other hand, in the state where the vehicle is traveling, the information processing device 500 causes display information v31b in which map information about a narrower range than the display information v31a (for example, map information about only a range in the vicinity of the current location) presented to be displayed on the output unit 501 as the display information v31 in a size smaller than the display information v31a, as shown in the lower drawing. In addition, at this time, the information processing device 500 may present only information about a selected route among a plurality of route candidates as information about a route to a destination presented in the map information. With such control, the information amount of information presented on the output unit 501 as map information (that is, the information amount of information that the display information v31 has) is restricted, while the proportion of the map information (that is, the display information v31) that occupies the display area of the output unit 501 is reduced, so that it is possible to ensure a wider field of view than during a stop. Note that the information processing device 500 may exert control such that screens are switched seamlessly by means of an animation display in the case of controlling the information amount of display information to be displayed on the output unit 301 (that is, switching screens), similarly to the information processing devices according to the aforementioned embodiment and other application examples. As a specific example, when switching the screens, the information processing device 500 may switch the screens seamlessly by means of an animation display that gives such an appearance impression that the field of view is enlarged centering on a piece of content at which the user is placing the line of sight.

In addition, in the case where the size of the display information v31 is restricted, the information processing device 500 may cause another type of display information different from the display information v31 to be displayed in a space within the display area of the output unit 501 ensured along with the restriction of the size. For example, in the lower drawing of FIG. 15, the information processing device 500 causes additional information such as guidance information given by the navigation device to be displayed as display information v33 and v35 in at least a part of the space within the display area of the output unit 501 ensured by restricting the size of the display information v31.

In addition, FIG. 16 is an explanatory diagram for describing another mode of the fourth application example of the information processing device according to the present embodiment. In the example shown in FIG. 16, the information processing device 500 causes information presented by an application such as a music player to be displayed on the output unit 501 as display information, and in accordance with the traveling state of the vehicle, controls the information amount of display information to be displayed on the output unit 501.

Specifically, in the state where the vehicle is at a stop, the information processing device 500 causes display information v41 in which a manipulation menu of the music player and a list of music that can be played are presented to be displayed on the output unit 501 in a larger size, as shown in the upper drawing. With such control, the information amount of information concerning the music player presented on the output unit 501 is improved, and it is also possible to improve recognizability of various types of information displayed as the display information v41.

On the other hand, in the state where the vehicle is traveling, the information processing device 500 causes display information v43 in which only information about music being played (for example, the title of music, elapsed time, and the like) is presented to be displayed on the output unit 501 in a size smaller than the display information v41, as shown in the lower drawing. With such control, the information amount of information concerning the music player presented on the output unit 501 is restricted, while the proportion of display information that occupies the display area of the output unit 501 is reduced, so that it is possible to ensure a wider field of view than during a stop.

Note that the foregoing is merely an example, and the type of information caused by the information processing device 500 to be displayed on the output unit 501 is not particularly limited. In addition, a trigger for the information processing device 500 to control the information amount of display information to be displayed on the output unit 501 is neither particularly limited. For example, in the case where the operation mode transitions from a predetermined mode to another mode, the information processing device 500 may control the information amount of display information to be displayed on the output unit 501. In addition, an example of the case of causing display information to be displayed on a head-up display has been described above, whilst the type of the device on which the display information is to be displayed and a method of displaying the display information are not particularly limited as long as it is possible to cause display information to be displayed (projected) in a predetermined display area.

As Application example 4 of the present embodiment, an example of the case where the information processing device according to the present embodiment is applied to a vehicle-mounted system has been described above with reference to FIG. 15 and FIG. 16.

<<6. Hardware Configuration>>

Figure 17:
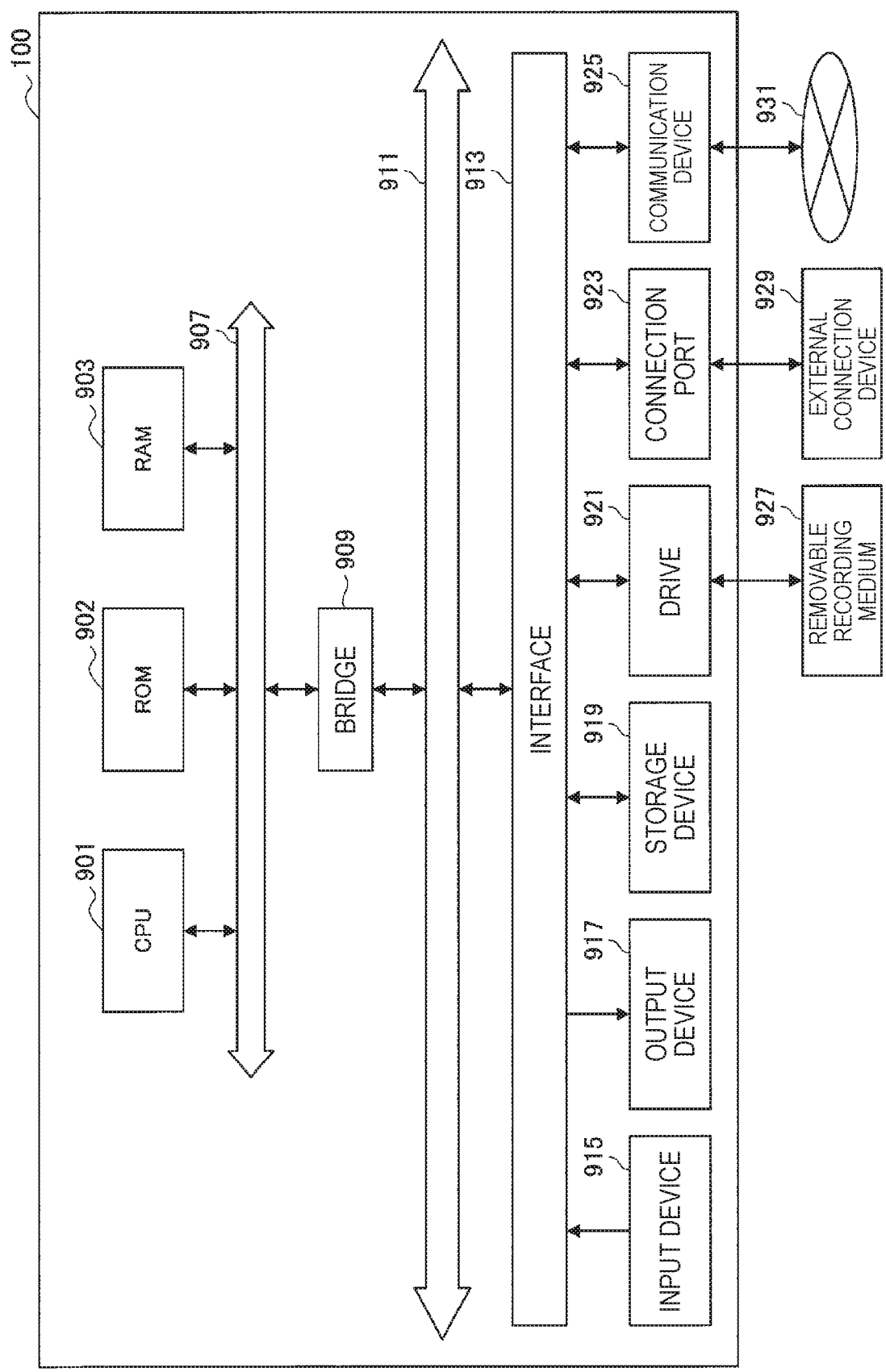
FIG. 17 is a functional block diagram showing a configuration example of a hardware configuration of the information processing device according to the embodiment.

Next, an example of a hardware configuration of the information processing device 100 described above will be described in detail with reference to FIG. 17. FIG. 17 is a function block diagram illustrating an example of the hardware configuration of the information processing device according to the present embodiment of the present disclosure.

The information processing device 100 according to the present embodiment mainly includes a CPU 901, a ROM 903, and a RAM 905. Furthermore, the information processing device 100 also includes a host bus 907, a bridge 909, an external bus 911, an interface 913, an input device 915, an output device 917, a storage device 919, a drive 921, a connection port 923, and a communication device 925.

The CPU 901 serves as an arithmetic processing device and a control device, and controls the overall operation or a part of the operation of the information processing device 100 according to various programs recorded in the ROM 903, the RAM 905, the storage device 919, or a removable recording medium 927. The ROM 903 stores programs, operation parameters, and the like used by the CPU 901. The RAM 905 primarily stores programs that the CPU 901 uses and parameters and the like varying as appropriate during the execution of the programs. These are connected with each other via the host bus 907 including an internal bus such as a CPU bus or the like. Note that the processing unit 110 described above with reference to FIG. 3 can be realized by, for example, the CPU 901.

The host bus 907 is connected to the external bus 911 such as a PCI (Peripheral Component Interconnect/Interface) bus via the bridge 909. Additionally, the input device 915, the output device 917, the storage device 919, the drive 921, the connection port 923, and the communication device 925 are connected to the external bus 911 via the interface 913.

The input device 915 is an operation mechanism operated by a user, such as a mouse, a keyboard, a touch panel, buttons, a switch, a lever, or a pedal. Also, the input device 915 may be a remote control mechanism (a so-called remote control) using, for example, infrared light or other radio waves, or may be an external connection device 929 such as a mobile phone or a PDA conforming to the operation of the information processing device 100. Furthermore, the input device 915 generates an input signal based on, for example, information which is input by a user with the above operation mechanism, and includes an input control circuit for outputting the input signal to the CPU 901. The user of the information processing device 100 can input various data to the information processing device 100 and can instruct the information processing device 100 to perform processing by operating the input device 915. Note that the input unit 103 described above with reference to FIG. 3 can be realized by, for example, the input device 915.

The output device 917 includes a device capable of visually or audibly notifying acquired information to a user. Examples of such device include display devices such as a CRT display device, a liquid crystal display device, a plasma display device, an EL display device and lamps, audio output devices such as a speaker and a headphone, a printer, and the like. For example, the output device 917 outputs a result obtained by various processes performed by the information processing device 100. More specifically, the display device displays, in the form of texts or images, a result obtained by various processes performed by the information processing device 100. On the other hand, the audio output device converts an audio signal including reproduced audio data and sound data into an analog signal, and outputs the analog signal. Note that the output unit 101 described above with reference to FIG. 3 can be realized by, for example, the output device 917.

The storage device 919 is a device for storing data configured as an example of a storage unit of the information processing device 100. The storage device 919 is configured from, for example, a magnetic storage unit device such as a HDD (Hard Disk Drive), a semiconductor storage device, an optical storage device, or a magneto-optical storage device. This storage device 919 stores programs to be executed by the CPU 901, and various data.

The drive 921 is a reader/writer for recording medium, and is embedded in the information processing device 100 or attached externally thereto. The drive 921 reads information recorded in the attached removable recording medium 927 such as a magnetic disk, an optical disc, a magneto-optical disk, or a semiconductor memory, and outputs the read information to the RAM 905. Furthermore, the drive 921 can write record in the attached removable recording medium 927 such as a magnetic disk, an optical disc, a magneto-optical disk, or a semiconductor memory. The removable recording medium 927 is, for example, a DVD medium, an HD-DVD medium, or a Blu-ray (a registered trademark) medium. In addition, the removable recording medium 927 may be a CompactFlash (CF; a registered trademark), a flash memory, an SD memory card (Secure Digital Memory Card), or the like. Alternatively, the removable recording medium 927 may be, for example, an IC card (Integrated Circuit Card) equipped with a non-contact IC chip or an electronic appliance. Note that the storage unit 120 described above with reference to FIG. 3 can be realized by, for example, at least one of the RAM 905, the storage device 919, or the removable recording medium 927.

The connection port 923 is a port for allowing devices to directly connect to the information processing device 100. Examples of the connection port 923 include a USB (Universal Serial Bus) port, an IEEE1394 port, a SCSI (Small Computer System Interface) port, and the like. Other examples of the connection port 923 include an RS-232C port, an optical audio terminal, an HDMI (a registered trademark) (High-Definition Multimedia Interface) port, and the like. By the external connection device 929 connecting to this connection port 923, the information processing device 100 directly obtains various types of data from the external connection device 929 and provides various types of data to the external connection device 929.

The communication device 925 is a communication interface including, for example, a communication device for connecting to a communication network 931. The communication device 925 is, for example, a wired or wireless LAN (Local Area Network), Bluetooth (registered trademark), a communication card for WUSB (Wireless USB), or the like. Alternatively, the communication device 925 may be a router for optical communication, a router for ADSL (Asymmetric Digital Subscriber Line), a modem for various communications, or the like. This communication device 925 can transmit and receive signals and the like in accordance with a predetermined protocol such as TCP/IP on the Internet and with other communication devices, for example. The communication network 931 connected to the communication device 925 includes a network and the like, which is connected via wire or wirelessly, and may be, for example, the Internet, a home LAN, infrared communication, radio wave communication, satellite communication, or the like. Note that the communication unit 130 described above with reference to FIG. 3 can be realized by, for example, the communication device 925.

Heretofore, an example of the hardware configuration capable of realizing the functions of the information processing device 100 according to the embodiment of the present disclosure has been shown, Each of the structural elements described above may be configured using a general-purpose material, or may be implemented by hardware dedicated to the function of each structural element. Accordingly, the hardware configuration to be used can be changed as appropriate according to the technical level at the time of carrying out the present embodiment. Note that, although not shown in FIG. 17, for example, it naturally includes various configurations corresponding to the information processing device 100 according to the present embodiment.

Note that it is also possible to develop a computer program for realizing the respective functions of the information processing device 100 according to the present embodiment as discussed above, and implement the computer program in a personal computer or the like. In addition, a computer-readable recording medium storing such a computer program may also be provided. The recording medium may be a magnetic disk, an optical disc, a magneto-optical disk, or flash memory, for example. Furthermore, the above computer program may also be delivered via a network, for example, without using a recording medium. In addition, the number of computers causing the computer program to be executed is not particularly limited. For example, the computer program may be executed in cooperation of a plurality of computers (for example, a plurality of servers or the like). Note that a single computer or a plurality of cooperating computers is also referred to as "computer system."

<<7. Conclusion>>

As described above, the information processing device according to the present embodiment determines an action of a predetermined object such as a user, a predetermined part of the user, a vehicle, or the like, for example, on the basis of an input situation of a manipulation on a predetermined input unit, a sensing result obtained by a predetermined sensing unit, or the like. Then, in accordance with a determination result of the action, the information processing device controls the information amount of display information to be displayed on a predetermined output unit. With such a configuration, the information processing device according to the present embodiment is capable of utilizing the display area of the output unit more effectively, and presenting information to the user in a more suitable manner in accordance with the situation at that moment. In addition, with the information processing device according to the present embodiment, the information amount of information displayed on the output unit is controlled automatically and seamlessly in accordance with a change in situation. Therefore, it is possible for the user to view various types of information and select desired information in a more suitable mode in accordance with the situation without being aware of a complicated manipulation such as explicitly changing the mode of presenting information to be displayed on the output unit, for example.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1) An information processing device including:
   a processing unit configured to determine an action of a predetermined object; and
   an output control unit configured to control an information amount of display information to be displayed on a predetermined output unit in accordance with a determination result of the action.

(2) The information processing device according to (1), in which in accordance with the determination result of the action, the output control unit controls the information amount by controlling at least any of the number of pieces or a size of the display information to be displayed on the output unit.

(3) The information processing device according to (2), in which in a case where a determination that the object has performed a predetermined action is made, the output control unit restricts at least any of the number of pieces or the size of the display information to be displayed on the previous term output unit as compared to the display information before the determination.

(4) The information processing device according to any one of (1) to (3), in which
   in accordance with the determination result of the action, the output control unit controls the information amount by superimposing another piece of the display information on at least a part of each piece of the display information to be displayed on the output unit.

(5) The information processing device according to any one of (1) to (4), in which
   in accordance with the determination result of the action, the output control unit controls an information amount of information that at least some pieces of the display information have.

(6) The information processing device according to any one of 1) to (5), in which
   in accordance with the determination result of the action, the output control unit causes second display information indicating classification of first display information to be a display target on the output unit to be displayed on the output unit.

(7) The information processing device according to any one of (1) to (6), in which
   in accordance with the determination result of the action, the output control unit controls a color of at least sonic pieces of the display information among one or more pieces of the display information to be displayed on the output unit.

(8) The information processing device according to any one of (1) to (7), in which
   the processing unit determines an action of a user as the action of the object in accordance with a detection result of a manipulation on a predetermined input unit.

(9) The information processing device according to (8), in which the processing unit determines the action of the user in accordance with at least any of the number of the manipulations, a frequency of the manipulations, or a manipulation amount of the manipulations.

(10) The information processing device according to (8) or (9), in which the manipulation is a manipulation of changing the display information to be displayed on the output unit among a plurality of pieces of the display information.

(11) The information processing device according to (10), in which the manipulation is a manipulation of causing arranged sequential pieces of the display information to be scrolled relatively with respect to a display area of the output unit.

(12) The information processing device according to any one of (1) to (7), in which
the processing unit determines the action of the object in accordance with a sensing result obtained by a predetermined sensing unit.

(13) The information processing device according to (12), in which the processing unit determines whether or not a user has approached the output unit as the action of the object.

(14) The information processing device according to (12), in which the processing unit determines whether or not a vehicle is traveling as the action of the object.

(15) The information processing device according to (12), in which in accordance with a sensing result of biological information of a user obtained by the sensing unit, the processing unit determines an action of the user.

(16) The information processing device according to any one of to (15), in which
the output control unit
causes at least some pieces of the display information among arranged sequential pieces of the display information to be displayed on the output unit, and
in accordance with a determination result of the action of the object, changes the at least some pieces of the display information to be a display target on the output unit by causing the sequential pieces of the display information to be scrolled relatively with respect to a display area of the output unit.

(17) The information processing device according to (16), in which
the output control unit
causes at least some pieces of the display information among the sequential pieces of the display information arranged along an arcuate track to be displayed on the output unit, and
in accordance with the determination result of the action of the object, changes the at least some pieces of the display information to be a display target on the output unit by causing the sequential pieces of the display information to be scrolled along the arcuate track relatively with respect to the display area of the output unit.

(18) The information processing device according to (16), in which
the output control unit
causes at least some pieces of the display information among the sequential pieces of the display information arranged along each of two axes orthogonal to each other to be displayed on the output unit, and
in accordance with the determination result of the action of the object, changes the at least some pieces of the display information to be a display target on the output unit by causing the sequential pieces of the display information to be scrolled along at least a partial axis of the two axes relatively with respect to the display area of the output unit.

(19) An information processing method including, by a computer:
determining an action of a predetermined object; and
in accordance with a determination result of the action, controlling an information amount of display information to be displayed on a predetermined output unit.

(20) A recording medium having a program recorded thereon, the program causing a computer to execute:
determining an action of a predetermined object; and
in accordance with a determination result of the action, controlling an information amount of display information to be displayed on a predetermined output unit.

REFERENCE SIGNS LIST

100 information processing device
101 output unit
103 input unit
105 sensing unit
110 processing unit
111 content acquisition unit
113 input analysis unit
115 output control unit
120 storage unit
130 communication unit

The invention claimed is:

1. An information processing device comprising:
an input unit configured to detect results of at least two manipulations by a user;
a processing unit configured to determine at least two actions of the user, respectively, in accordance with the detection results of the input unit, wherein the determined actions include an initial low speed action followed by a subsequent high speed action; and
an output control unit configured to control an information amount of display information to be displayed on a display in accordance with a determination result of each action of the user,
wherein the output control unit causes arranged sequential pieces of display information to be scrolled with respect to the display when it is determined that the at least two manipulations are performed,
wherein, in response to the initial low speed action, the output control unit controls an initial number of pieces and an initial size of the display information to be scrolled on the display,
wherein, in response to the subsequent high speed action, the output control unit controls a subsequent number of pieces and a subsequent size of the display information to be scrolled on the display, wherein the subsequent number of pieces is larger than the initial number of pieces and the subsequent size of the display information is less than the initial size of the display information,
wherein the processing unit determines a time of switching between the initial low speed action and the subsequent high speed action,
wherein, at the time of the determined switching, the processing unit further determines a line of sight of the user with respect to the output while the at least two manipulations are performed,
wherein the processing unit determines a gazed-at piece of the sequential pieces display information corresponding to the line of sight of the user, wherein the output control unit causes the display to transition from the initial number of pieces and the initial size of the display information to the subsequent number of pieces and the subsequent size via an enlarging of a field of view centered on the determined gazed-at piece of display information corresponding to the line of sight of the user, and wherein the processing unit and the output control unit are each implemented via at least one processor.

2. The information processing device according to claim 1, wherein in a case where a determination is made that an object has performed a predetermined action in accordance with the detection result, the output control unit restricts at least any of the number of pieces or the size of the display information to be displayed on the output as compared to the display information before the determination.

3. The information processing device according to claim 1, wherein in accordance with the determination result of at least one action of the at least two actions, the output control unit controls the information amount by superimposing another piece of the display information on at least a part of each piece of the display information to be displayed on the output.

4. The information processing device according to claim 1, wherein in accordance with the determination result of at least one action of the at least two actions, the output control unit controls the information amount of information that at least some pieces of the display information have.

5. The information processing device according to claim 1, wherein in accordance with the determination result of at least one action of the at least two actions, the output control unit causes additional display information indicating classification of the display information to be a display target on the output to be displayed on the output.

6. The information processing device according to claim 1, wherein in accordance with the determination result of at least one action of the at least two actions, the output control unit controls a color of at least some pieces of the display information among one or more pieces of the display information to be displayed on the output.

7. The information processing device according to claim 1, wherein the processing unit determines at least one action of the at least two actions of the user in accordance with at least any of a number of the at least two manipulations, a frequency of the at least two manipulations, or a manipulation amount of the at least two manipulations.

8. The information processing device according to claim 1, wherein the output control unit changes the display information to be displayed on the output among a plurality of pieces of the display information when it is determined that the at least two manipulations are performed.

9. The information processing device according to claim 1, wherein the processing unit determines the at least two actions of the user in accordance with a sensing result obtained by one or more sensors.

10. The information processing device according to claim 9, wherein the processing unit further determines the at least two actions of the user based on whether or not the user has approached the output.

11. The information processing device according to claim 9, wherein the processing unit is further configured to determine an action of an object based on whether or not a vehicle is traveling, and wherein the output control unit further controls the information amount of the display information to be displayed on the output in accordance with a determination result of the action of the object.

12. The information processing device according to claim 9, wherein in accordance with a sensing result of biological information of the user obtained by the one or more sensors, the processing unit determines at least one action of the at least two actions of the user.

13. The information processing device according to claim 1, wherein the output control unit
causes at least some pieces of the display information among the sequential pieces of the display information arranged along an arcuate track to be displayed on the output, and in accordance with the determination result of an action of an object, changes the at least some pieces of the display information to be a display target on the output unit by causing the sequential pieces of the display information to be scrolled along the arcuate track relatively with respect to the display area of the output.

14. The information processing device according to claim 1, wherein the output control unit
causes at least some pieces of the display information among the sequential pieces of the display information arranged along each of two axes orthogonal to each other to be displayed on the output, and in accordance with the determination result of an action of an object, changes the at least some pieces of the display information to be a display target on the output by causing the sequential pieces of the display information to be scrolled along at least one axis of the two axes relatively with respect to the display area of the output unit.

15. The information processing device according to claim 1, wherein the at least two manipulations comprise at least two scroll manipulations performed on the input unit by a manipulation body.

16. An information processing method comprising, by a computer:

detecting results of at least two manipulations by a user;

determining at least two actions of the user, respectively, in accordance with the detection results, wherein the determined actions include an initial low speed action followed by a subsequent high speed action; and in accordance with a determination result of each action of the user, controlling an information amount of display information to be displayed on a display, wherein arranged sequential pieces of display information are scrolled with respect to the display when it is determined that the at least two manipulations are performed, wherein, in response to the initial low speed action, an initial number of pieces and an initial size of the display information to be scrolled on the display are controlled, wherein, in response to the subsequent high speed action, a subsequent number of pieces and a subsequent size of the display information to be scrolled on the display are controlled, wherein the subsequent number of pieces is larger than the initial number of pieces and the subsequent size of the display information is less than the initial size of the display information, wherein a time of switching between the initial low speed action and the subsequent high speed action is determined, wherein, at the time of the determined switching, a line of sight of the user is determined with respect to the output while the at least two manipulations are performed, wherein a gazed-at piece of the sequential pieces display information corresponding to the line of sight of the user is determined, and wherein the display is caused to transition from the initial number of pieces and the initial size of the display information to the subsequent number of pieces and the subsequent size via an enlarging of a field of view centered on the determined gazed-at piece of display information corresponding to the line of sight of the user.

17. A non-transitory computer-readable recording medium having a program recorded thereon, which when executed by a computer causes the computer to execute a method, the method comprising:

detecting results of at least two manipulations by a user;

determining at least two actions of the user, respectively, in accordance with the detection results, wherein the determined actions include an initial low speed action followed by a subsequent high speed action; and in accordance with a determination result of each action of the user, controlling an information amount of display information to be displayed on a display, wherein arranged sequential pieces of display information are scrolled with respect to the display when it is determined that the at least two manipulations are performed, wherein, in response to the initial low speed action, an initial number of pieces and an initial size of the display information to be scrolled on the display are controlled, wherein, in response to the subsequent high speed action, a subsequent number of pieces and a subsequent size of the display information to be scrolled on the display are controlled, wherein the subsequent number of pieces is larger than the initial number of pieces and the subsequent size of the display information is less than the initial size of the display information, wherein a time of switching between the initial low speed action and the subsequent high speed action is determined, wherein, at the time of the determined switching, a line of sight of the user is determined with respect to the output while the at least two manipulations are performed, wherein a gazed-at piece of the sequential pieces display information corresponding to the line of sight of the user is determined, and wherein the display is caused to transition from the initial number of pieces and the initial size of the display information to the subsequent number of pieces and the subsequent size via an enlarging of a field of view centered on the determined gazed-at piece of display information corresponding to the line of sight of the user.

* * * * *